(12) United States Patent
Kautzsch

(10) Patent No.: US 11,041,757 B2
(45) Date of Patent: Jun. 22, 2021

(54) TUNABLE FABRY-PEROT FILTER ELEMENT, SPECTROMETER DEVICE AND METHOD FOR MANUFACTURING A TUNABLE FABRY-PEROT FILTER ELEMENT

(71) Applicant: Infineon Technologies Dresden GmbH & Co. KG, Dresden (DE)

(72) Inventor: Thoralf Kautzsch, Dresden (DE)

(73) Assignee: INFINEON TECHNOLOGIES DRESDEN GMBH & CO. KG, Dresden (DE)

( * ) Notice: Subject to any disclaimer, the term of this patent is extended or adjusted under 35 U.S.C. 154(b) by 0 days.

(21) Appl. No.: 16/703,428

(22) Filed: Dec. 4, 2019

(65) Prior Publication Data

US 2020/0232848 A1 Jul. 23, 2020

(30) Foreign Application Priority Data

Jan. 18, 2019 (EP) .................................... 19152623

(51) Int. Cl.
*G01J 3/28* (2006.01)
*G01J 3/26* (2006.01)
*G02B 26/00* (2006.01)

(52) U.S. Cl.
CPC .............. *G01J 3/2823* (2013.01); *G01J 3/26* (2013.01); *G02B 26/001* (2013.01)

(58) Field of Classification Search
CPC ...... G01B 3/26; G01B 3/2823; G02B 26/001; G01J 3/26; G01J 3/2823
See application file for complete search history.

(56) References Cited

U.S. PATENT DOCUMENTS 9,136,328 B2 * 9/2015 Kautzsch .............. H01L 21/764
2002/0150130 A1 * 10/2002 Coldren .............. H01S 5/18305
372/20

(Continued)

FOREIGN PATENT DOCUMENTS

WO 3621140 A1 7/1996
WO WO-2012004379 A1 * 1/2012 .......... G02B 26/001

OTHER PUBLICATIONS

Skotnicki, T. et al., "Silicon-on-nothing (SON) technology," 2006 8th International Conference on Solid-State and Integrated Circuit Technology Proceedings, Shanghai, 2006, pp. 11-14. (Year: 2006).*

(Continued)

*Primary Examiner* — Michael A Lyons
(74) *Attorney, Agent, or Firm* — Slater Matsil, LLP

(57) ABSTRACT

A tunable Fabry-Perot (FP) filter element includes a first FP filter stack arranged at a movable first carrier element, and a second FP filter stack arranged in an opposing configuration to the first FP filter stack at a second carrier element, wherein, upon an actuation, the first carrier element with the first FP filter stack is vertically movable with respect to the second carrier element with the second FP filter stack, for adjusting the distance between the first and second opposing FP filter stack and wherein the movable first carrier element is formed as an SON structure (SON=silicon-on-nothing) in an SON substrate, wherein the SON structure is movable suspended by means of a mechanical spring element to the SON substrate.

19 Claims, 19 Drawing Sheets

(56) References Cited

U.S. PATENT DOCUMENTS

2009/0040616 A1\* 2/2009 Lin .................... G01J 3/26
                                                                                                                  359/579
2019/0265163 A1\* 8/2019 Johansen ............ G01J 3/26

OTHER PUBLICATIONS

Jurczak, Malgorzata et al., "Silicon-on-Nothing (SON) an Innovative Process for Advanced CMOS", XP-000970486, IEEE Transactions on Electron Device, vol. 47, No. 11, Nov. 2000, pp. 2179-2185.

\* cited by examiner

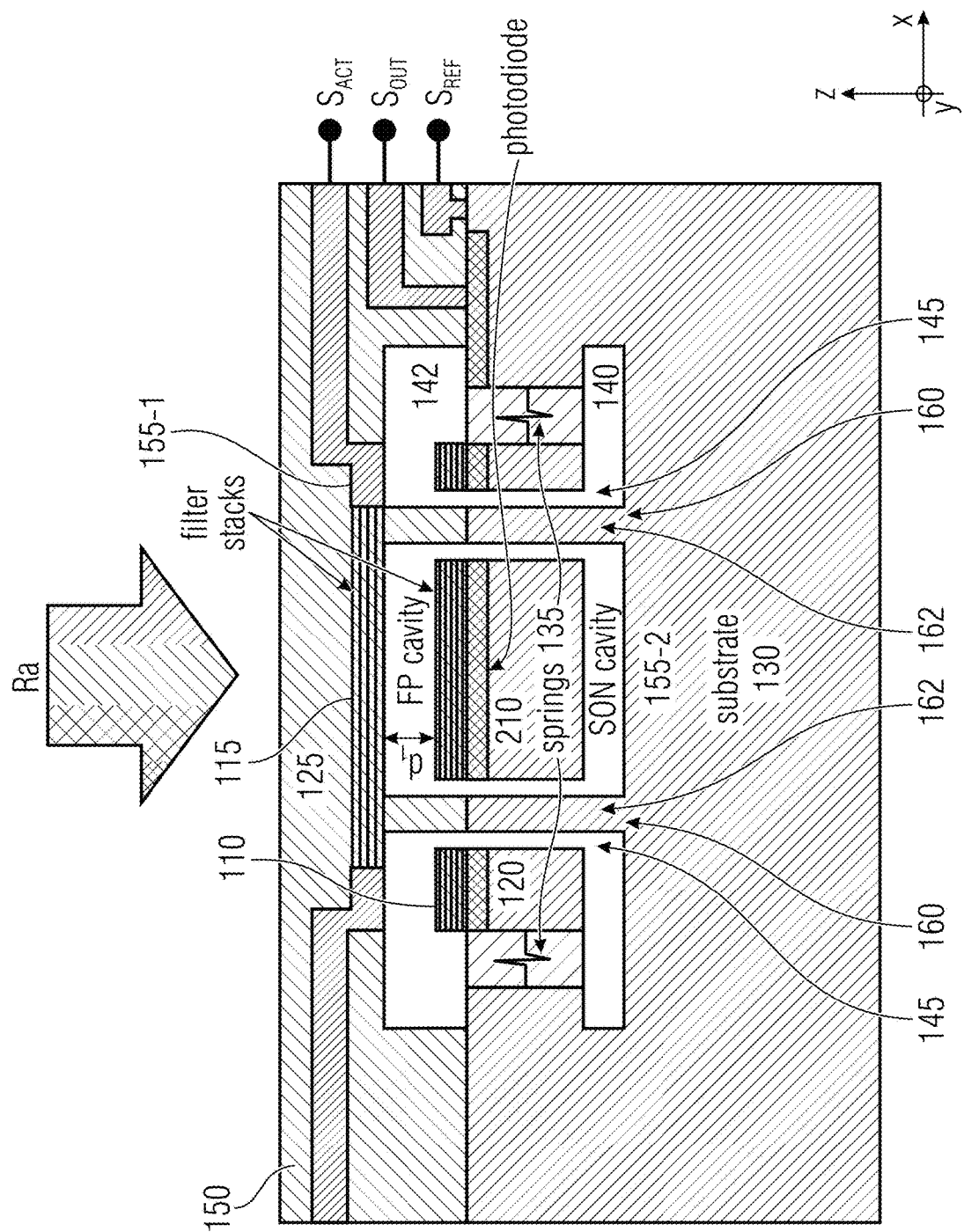

300

```
┌─────────────────────────────────────────────────┐
│   Forming a first FP filter stack on a SON substrate   │──310
└─────────────────────────────────────────────────┘

┌─────────────────────────────────────────────────┐
│   Forming a movable first carrier element as a SON     │
│   structure in the SON substrate, wherein the SON structure │──320
│   is movable suspended by means of mechanical spring   │
│   elements to the SON substrate                        │
└─────────────────────────────────────────────────┘

┌─────────────────────────────────────────────────┐
│   Forming a sacrificial layer for covering the first FP filter │──330
│   stack on the SON substrate                           │
└─────────────────────────────────────────────────┘

┌─────────────────────────────────────────────────┐
│   Forming a second FP filter stack on the sacrificial layer │──340
└─────────────────────────────────────────────────┘

┌─────────────────────────────────────────────────┐
│   Forming a capping structure on the sacrificial layer,│
│   the capping structure having an opening for providing│──350
│   access to the sacrificial layer                      │
└─────────────────────────────────────────────────┘

┌─────────────────────────────────────────────────┐
│   Forming an actuation structure coupled to the movable│
│   first carrier element for adjusting the distance between│──360
│   the first and second opposing FP filter stacks upon  │
│   an actuation signal                                  │
└─────────────────────────────────────────────────┘

┌─────────────────────────────────────────────────┐
│   Removing the sacrificial layer through the opening   │
│   of the capping structure so that the first carrier element│
│   with the first FP filter stack is vertically movable with │──370
│   respect to the second carrier element with the second│
│   FP filter stack                                      │
└─────────────────────────────────────────────────┘
```

Fig. 6

TUNABLE FABRY-PEROT FILTER ELEMENT, SPECTROMETER DEVICE AND METHOD FOR MANUFACTURING A TUNABLE FABRY-PEROT FILTER ELEMENT

This application claims the benefit of European Application No. 19152623, filed on Jan. 18, 2019, which application is hereby incorporated herein by reference.

TECHNICAL FIELD

Embodiments relate to a tunable Fabry-Perot (FP) filter element, to a spectrometric device (spectrometer) with such an integrated, tunable Fabry-Perot filter element and to a method for manufacturing an integrated, tunable Fabry-Perot filter element.

BACKGROUND

The detection of environmental parameters in the ambient atmosphere is becoming increasingly important in the implementation of appropriate sensors within mobile devices, but also at the application in home automation, such as smart home and, for example, in the automotive sector. However, with the evermore extensive use of sensors, there is also a particular need to be able to produce such sensors as inexpensively as possible and thus cost-effectively, but nevertheless the resulting reliability and accuracy of the sensors should be maintained or even increased.

On the technical field of color recognition and/or of gas analysis, miniaturized spectrometers focus on mobile application of optical measurement and detection techniques and their use in standard consumer products, such as smart phones and other handheld devices. In this context, high-volume manufactured spectrometer products are required, especially on the condition that these devices satisfy constraints regarding physical dimensions, performance and cost.

On the other hand, there is an emerging demand for hyper spectral imaging devices, wherein their possible application ranges from recycling and plastic sorting, geology and mineral inspection, and also medical control to food and agriculture supervision. Optical recognition methods may comprise a monochrome imaging, RGB imaging, a multi-spectral imaging, a hyperspectral imaging, a high-pass spectral imaging as well as spectroscopy.

There are multiple ways of designing a miniature color sensor, which follow different approaches, wherein a first approach may relate to a side-by-side use of transmission filters, a second approach may relate to an evaluation of the position of photo generated charge carriers in the silicon bulk material, and a further (third) approach may relate to the use of a micro machined grating structure.

Generally, there is a need in the art for an approach to implement improved tunable optical filter elements, e.g., integrated, tunable Fabry-Perot filter elements, offering a combination of a high resolution, a small footprint and a relatively large target spectra, and provide a relatively low-complexity of these designs resulting in an inexpensive system fabrication.

Such need can be solved by the tunable Fabry-Perot filter element according to independent claim 1, the spectrometric device (spectrometer) according to claim 16 and the method for manufacturing a tunable Fabry-Perot filter element according to claim 17.

In addition, specific implementations of the different embodiments are defined in the dependent claims.

SUMMARY

According to an embodiment, a tunable Fabry-Perot (FP) filter element comprises a first FP filter stack arranged at a movable first carrier element, and a second FP filter stack arranged in an opposing configuration to the first FP filter stack at a second carrier element, wherein, upon an actuation, the first carrier element with the first FP filter stack is vertically movable with respect to the second carrier element with the second FP filter stack, for adjusting the distance between the first and second opposing FP filter stack, and wherein the movable first carrier element is formed as an SON structure (SON=silicon-on-nothing) in an SON substrate, wherein the SON structure is movable suspended by means of mechanical spring elements to the SON substrate.

According to an embodiment, a spectrometer device comprises an integrated, tunable Fabry-Perot (FP) filter element, and an optical detector which is arranged in an illumination direction downstream to the integrated, tunable Fabry-Perot (FP) filter element.

According to an embodiment, a method for manufacturing a tunable Fabry-Perot (FP) filter element comprises forming a first FP filter stack on a SON substrate, forming a movable first carrier element as a SON structure in the SON substrate, wherein the SON structure is movable suspended by means of mechanical spring elements to the SON substrate, forming a sacrificial layer for covering the first FP filter stack on the SON substrate, forming a second FP filter stack on the sacrificial layer, forming a capping structure on the sacrificial layer, the capping structure having an opening for providing access to the sacrificial layer, forming an actuation structure coupled to the movable first carrier element for adjusting the distance between the first and second opposing FP filter stacks upon an actuation signal, and removing the sacrificial layer through the opening of the capping structure so that the first carrier element with the first FP filter stack is vertically movable with respect to the second carrier element with the second FP filter stack.

According to embodiments, an SON structure (SON=silicon-on-nothing) is formed as a movable deflectable element with an opposing fixed top plate of a cover or lid, wherein the opposing dielectric mirror stacks (=Bragg mirrors) are arranged on the one side of the top plate and on an opposite side on the movable element, with a Fabry-Perot cavity there-between.

According to an embodiment, a detector, e.g., a photodiode arrangement may also be arranged on or in the movable element.

The present concept of a tunable Fabry-Perot filter element on a vertically movable SON structure may simplify the manufacturing-related realization of a tunable integrated Fabry-Perot spectrometer device (interferometer), wherein relatively stiff structures may be implemented for both, the movable SON structure and the top plate by means of robust manufacturing processes.

BRIEF DESCRIPTION OF THE DRAWINGS

Embodiments of the present integrated, tunable Fabry-Perot filter element, the spectrometer device and the method for manufacturing the integrated, tunable Fabry-Perot filter element are described herein making reference to the appended drawings and figures.

FIG. 3a shows a schematic cross-sectional view of an integrated, tunable Fabry-Perot filter element according to a further embodiment;

FIG. 6 shows an exemplary process flow (flowchart) of the method of manufacturing a tunable Fabry-Perot filter element according to an embodiment.

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of semiconductor devices. The specific embodiments discussed are merely illustrative of specific ways to make and use the present concept, and do not limit the scope of the embodiments. In the following description of embodiments, the same or similar elements having the same function have associated therewith the same reference signs or the same name, and a description of these elements will not be repeated for every embodiment. Moreover, features of the different embodiments described hereinafter may be combined with each other, unless specifically noted otherwise.

It is understood that when an element is referred to as being "connected" or "coupled" to another element, it may be directly connected or coupled to the other element, or intermediate elements may be present. Conversely, when an element is referred to as being "directly" connected to another element, "connected" or "coupled," there are no intermediate elements. Other terms used to describe the relationship between elements should be construed in a similar fashion (e.g., "between" versus "directly between", "adjacent" versus "directly adjacent", and "on" versus "directly on", etc.).

For facilitating the description of the different embodiments, the figures comprise a Cartesian coordinate system x, y, z, wherein the x-y-plane corresponds, i.e., is parallel, to the first main surface region of the SON substrate, and wherein the depth direction vertical to the first main surface region and into the SON substrate corresponds to the "−z" direction, i.e., is parallel to the z direction. In the following description, the term "lateral" means a direction parallel to the x-direction, wherein the term "vertical" means a direction parallel to the z-direction.

Figure 1:
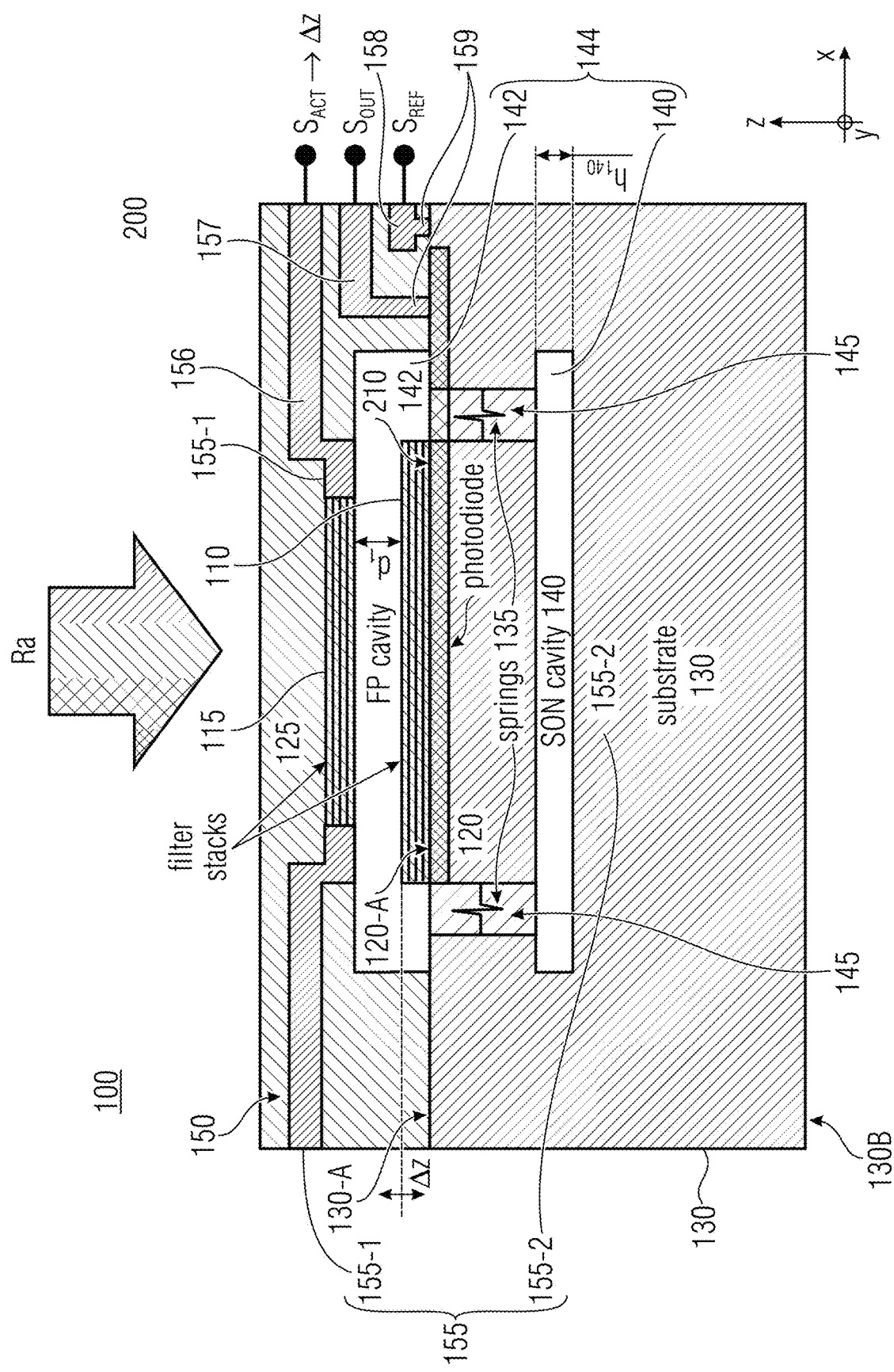
FIG. 1 shows a schematic cross-sectional view of an integrated, tunable Fabry-Perot filter element according to an embodiment.

FIG. 1 shows a schematic cross-sectional view of a tunable Fabry-Perot filter element 100 according to an embodiment.

As shown in FIG. 1, the tunable Fabry-Perot filter element 100 comprises a first Fabry-Perot filter stack 110 and a second Fabry-Perot filter stack 115. The first Fabry-Perot filter stack 110, e.g., in form of a Bragg mirror, is arranged at a movable first carrier element 120. The second Fabry-Perot filter stack 115, e.g., a second Bragg mirror, is arranged in an opposing configuration to the first Fabry-Perot filter stack 110 at a second carrier element 125. Upon an actuation, e.g., based on an actuation signal $S_{ACT}$, the first carrier element 120 with the first Fabry-Perot filter stack 110 is vertically movable with respect to the second carrier element 125 with the second Fabry-Perot filter stack 115, for adjusting the distance $d_1$ between the first and second opposing Fabry-Perot filter stacks 110, 115. The movable first carrier element 120 is formed as an SON structure (SON=silicon-on-nothing) in, e.g., a surface region of, an SON substrate 130, wherein the SON structure 120 is movably suspended by means of a mechanical spring element 135 or by means of a plurality of mechanical spring elements 135 to the SON substrate 130, i.e., to the laterally surrounding SON substrate 130.

As shown in FIG. 1, the SON substrate 130 comprises an SON cavity 140, wherein the movable first carrier element 120 in form of the SON structure is formed vertically (=in z direction) on the cavity 140 so that the movable first carrier element 120 which is movable suspended by means of the mechanical spring element(s) 135 to the laterally surrounding SON substrate 130 is vertically movable or displaceable. The vertical movement or displacement of the movable first carrier element 120 may be restricted by the spring stiffness of the mechanical spring element(s) 135, the vertical distance $d_1$ between the first and the second Fabry-Perot filter stacks 110, 115, and/or the height $h_{140}$ of the SON cavity 140 parallel to the z-direction.

The strength of the actuation or actuation signal $S_{ACT}$ defines the vertical movement or displacement $\Delta z$ of the movable first carrier element 120 with respect to the second carrier element 125, i.e., parallel to the z-direction and relative to the rest position (idle state) of the movable first carrier element 120.

Based on the "tuned" (=adjusted) vertical distance $d_1$ between the first and the second Fabry-Perot filter stack 110, 115, the optical characteristic and, especially, the transmission spectrum of the Fabry-Perot filter element 100 is precisely tunable. As shown in FIG. 1, the first and second Fabry-Perot filter stacks 110, 115 are arranged in an opposing, face-to-face configuration.

The SON substrate 130 has an SON cavity 140 in the semiconductor material of the SON substrate. The movable first carrier element 120 is formed between the first main surface region 130-A of the SON substrate 130 and the SON cavity 140 and is laterally bordered by a trench or a trench structure 145 to provide a lateral separation from the laterally surrounding semiconductor material of the SON substrate 130. The mechanical spring elements 135 are arranged between the movable first carrier element 120 and the laterally surrounding semiconductor material of the SON substrate 130 for movably suspending the movable first carrier element 120 (the SON structure) with respect to the SON substrate 130 and, thus, with respect to the second carrier element 125. The tunable Fabry-Perot filter element 100 further comprises a capping or lid structure 150 for covering the first and second Fabry-Perot filter stacks 110, 115 and, especially, for covering the movable first carrier element 120. As shown in FIG. 1, the movable first carrier element 120 is a part of the capping structure 150, for example.

As optionally shown in FIG. 1, the integrated, tunable Fabry-Perot filter element 100 may further form a spectrometric device (=spectrometer) 200 by providing an optical detector 210, e.g., a photodiode or photodiode array, wherein the optical detector 210 is arranged in an illumination direction of the radiation Ra downstream to the integrated, tunable Fabry-Perot filter element 100, e.g., in the semiconductor material of the movable first carrier element 120 between the first Fabry-Perot filter stack 110 and the movable first carrier element 120. The optical detector 210 provides an output signal $S_{OUT}$ based on the incident radiation.

According to a further embodiment (not shown in FIG. 1), the optical detector may be arranged at the second main surface region 130-B (back side) of the SON substrate 130 as far as the semiconductor material of the SON substrate is sufficiently transparent for the illumination radiation Ra transmitted through the integrated, tunable Fabry-Perot filter element boo. According to a further embodiment (not shown in FIG. 1a), the optical detector 210 may be arranged on a further semiconductor substrate in an illumination direction downstream to the integrated, tunable Fabry-Perot filter element 100.

According to an embodiment, the filter element 100 may comprise an actuator 155 for moving or displacing upon reception of an actuation signal $S_{ACT}$ the movable first carrier element 120 vertically with respect to the second carrier element 125, e.g., the capping structure 150. The actuator 155 may comprise an electrostatic actuator, a piezoelectric actuator and/or a thermal actuator having a thermal bending structure, or a combination of at least two of the above indicated implementations of the actuator 155.

According to an embodiment, the actuator 155 is an electrostatic actuator having a first and second electrode structure 155-1, 155-2 for effecting the actuation as an electrostatic actuation by providing a potential difference between the first and second electrode structures 155-1, 155-2. The first electrode structure 155-1 may be arranged to receive the actuation signal $S_{ACT}$, e.g., an actuation voltage, wherein the second electrode structure 155-2 may be arranged to receive a reference signal $S_{REF}$, e.g., a reference voltage or ground voltage.

According to an embodiment, the first electrically conductive electrode structure 155-1 is arranged at the movable first carrier element 120, wherein the second electrically conductive electrode structure 155-2 is arranged as a conductive region in the semiconductor material of the SON substrate 130, e.g., vertically below the SON cavity 140.

According to an embodiment, at least one of the electrostatic electrodes 155-1, 155-2 may be formed as an electrically conductive layer within one of the Fabry-Perot filter stacks 110, 115.

The capping structure 150 (BEOL stack) may comprise metallization structures 154, e.g., metal layer(s) 155-1 or metal lines 156, 157, 158, which are separated by and/or embedded in an insulation (dielectric) material of the capping structure 150. Connections between different metallization layers may be provided, for example, by vias 159 through the insulation material of the capping structure 150. Thus, the actuation signal $S_{ACT}$ may be applied to the conductive line 156 which is connected, for example, to the electrostatic electrode 155-1. The output signal $S_{OUT}$ from the optical detector 210 may be provided on the conductive line 157, wherein the reference signal $S_{REF}$ may be applied to the conductive line 158, for example.

According to a further embodiment (not shown in FIG. 1), the first electrostatic electrode (=the first electrode structure) 155-1 is a conductive layer within the second Fabry-Perot filter stack 115, wherein the second electrostatic electrode (=the second electrode structure) 155-2 is arranged as a conductive region or layer in the semiconductor material of the movable first carrier element 120.

According to a further embodiment, an optical detector or photodetector 210 may be optionally arranged at the movable first carrier element 120 between the first Fabry-Perot filter stack 110 and the first carrier element 120. According to an embodiment, the photodetector 210 at the first carrier element 120 may be integrated in the semiconductor material of the SON structure 120, e.g., at a first main surface region 120-A of the SON structure 120.

According to a further embodiment (not shown in FIG. 1), the photodetector 210 at the first carrier element 120 may be integrated in an additional semiconductor layer epitaxially grown onto the semiconductor material of the first carrier element (SON structure) 120. Thus, the detector 210 at the movable plate 120 may be of different material, e.g., an epitaxially grown Germanium or SiGe layer. This provides the opportunity to operate a spectrometer at other spectral ranges.

According to an embodiment, the spring elements 135, which span the trench or trench structure 145 between the first carrier element 120 (SON structure) and the laterally surrounding semiconductor material of the SON substrate 130, may be formed as torsional and/or bending spring elements between the SON structure 120 and the remaining SON substrate 130.

The trench structure 145 provides a mechanical stress and thermal decoupling of the semiconductor material of the movable first carrier element 120 (SON structure) from the surrounding semiconductor material of the SON substrate 130. Moreover, as the movable first carrier element 120 in form of the SON structure is suspended in the sealed cavity 144, e.g., in a low-pressure or vacuum cavity, and is thus thermally insulated from the environment surrounding the Fabry-Perot filter element.

According to an embodiment, the lid or capping element 150 is arranged on the SON substrate 130 for covering and protecting the movable first carrier element (SON structure) 120. According to an embodiment, the lid or capping element 150 is arranged on the SON substrate 130 for hermetically covering the movable first carrier element (SON structure) 120 to maintain a defined internal pressure P within the tunable Fabry-Perot filter element 100 to provide a cavity 142 on the movable first carrier element 120. The SON cavity 140 is fluidically connected over the trench structure 145 with the cavity 142, wherein the SON cavity 140 and the cavity 142 form together the sealed cavity 144 for the movable first carrier element 120. The internal pressure in the sealed cavity 144 may be a near vacuum or a low-pressure condition.

According to an embodiment, pillar elements (not shown in FIG. 1) may extend through the movable first carrier element 120 and the first Fabry-Perot filter stack and may extend between the semiconductor material of the SON substrate 130 (at the SON cavity 140) and the lid element 150, wherein the pillar elements are mechanically coupled between the SON substrate 130 and the lid element 150 and are mechanically decoupled from the movable first carrier element 120 and the first Fabry-Perot filter stack 110. Thus, the movable first carrier element 120 is still movable and displaceable with respect to the second carrier element 125.

According to a further embodiment, the Fabry-Perot filter element 100 may comprise a comb drive structure (not shown in FIG. 1) e.g., in form of an interdigital structure laterally arranged between the first carrier element 120 (SON structure) and the laterally surrounding semiconductor material of the SON substrate 130 for capacitively sensing the vertical distance $d_1$ between the first and second opposing Fabry-Perot filter stacks 110, 115.

According to an embodiment, the Fabry-Perot filter element 110 may comprise a control circuit 220 which may be configured to provide the actuator 155 with the actuation signal $S_{ACT}$ for controlling the potential difference between the first and second electrode structure 155-1, 155-2 for adjusting and tuning the distance $d_1$ between the first and second Fabry-Perot filter stack 110, 115. Thus, according to an embodiment, the actuation signal $S_{ACT}$ may be applied to enable the actuator 155, e.g., an electrostatic actuator, a piezoelectric actuator and/or a thermal actuator or any combination thereof.

To summarize, the silicon-on-nothing (SON) structure 120 as the movable first carrier element 120 is combined with a fixed second carrier element 125, e.g., in form of a fixed top plate of the capping structure 150. The fixed second carrier element 125 provides the upper dielectric mirror stack (=the second Fabry-Perot filter stack) 115 of the integrated, tunable Fabry-Perot filter element 100. The movable first carrier element 120 may comprise the first Fabry-Perot filter stack (=the lower mirror stack) 110 of the Fabry-Perot filter element 100 together with the optional optical detector 210, e.g., in form of a photodiode or a photodiode array. The variation of the height $d_1$ of the cavity 142 between the first and second Fabry-Perot filter stacks 110, 115 may be tuned by means of an actuation of an electrostatic actuator, a piezoelectric actuator and/or a thermal actuator. Thus, the adjustable cavity 142 forms the adjustable spacer of the Fabry-Perot filter element 100.

According to an embodiment and in case of an electrostatic actuation, a part of the movable first carrier element 120 (SON structure) with the first Fabry-Perot filter stack 110 acts as the first electrode structure (bottom electrode) 155-1. A part of the fixed, second carrier element 125, e.g., a part of the fixed upper Fabry-Perot filter stack 115, which is arranged face-to-face to the first Fabry-Perot filter stack 110 may serve as the second electrode structure 155-2 (top electrode) opposing to the first electrode structure 155-1 (lower electrode).

According to an embodiment and in case of an electrostatic actuation, a part of the movable first carrier element 120 (SON structure) with the first Fabry-Perot filter stack 110 acts as the first electrode structure (top electrode) 155-1. At least a part of the remaining semiconductor material of the SON substrate 130 vertically arranged to the SON structure 120 may act as the second electrode structure 155-2 (bottom electrode).

The properties of the structure of the tunable Fabry-Perot filter element 100 can be summarized as follows:

The movable first carrier element 120, i.e., the SON silicon plate 120 provides a very stiff, stress-free and ideally flat support for the first Fabry-Perot filter stack (bottom filter stack) 110.

The Fabry-Perot spacer 142, i.e., the distance $d_1$ between the first and second opposing Fabry-Perot filter stacks 110, 115, can be tuned by means of the actuation signal $S_{ACT}$.

A photodetector 210, e.g., in form of a photodiode or photodiode array, can be integrated in the movable first carrier element 120.

The movable first carrier element 120 (the movable part) is covered with a closed sealing in form of the capping structure 150. The surrounded cavity 144 can even be evacuated or provided with a defined internal pressure.

Tunable spectrometers 200, i.e., a spectrometer device with the integrated tunable Fabry-Perot filter 100 can be used, e.g., for color recognition (having high demands) and furthermore for gas analysis (having lower demands).

In a multi-gas sensor, e.g., a warpage or bend of the mirror layers 110, 115 having different refractive indices "high-low" applied to surface areas arranged opposite each other adjacent to an oscillation volume, i.e., the a cavity 142, is essentially not disturbing or impairing.

On the other hand, if an optical detection or spectrometer function in the near-infrared range (NIR) at about 850 nm to 900 nm with a low FWHM (full width at half maximum) in a range of some 10 nm or some nanometers is to be carried out, high demands are placed on the mechanical structure 130 that carries the integrated tunable Fabry-Perot filter (FP filter) 100.

According to the present approach, a SON structure 120 is formed as a movable deflectable element 120 with an opposing fixed top plate 125 of a cover 150, wherein the opposing dielectric mirror stacks 110, 115 are arranged on the one side on the top plate 125 and on an opposite side on the movable element 120, with an FP cavity 142 therebetween. A detector 210, e.g., a photodiode, may also be arranged on or in the movable element 120. The present concept of an FP element 100 on a SON structure may simplify the manufacturing-related realization of a tunable integrated FP interferometer 200, wherein relatively stiff structures may be implemented for both the movable element 120 and the top plate 125 by means of manufacturing processes already technically realized in other fields.

According to embodiments, the manufacturing-related object can be realized in that the opposing mirror structures 110, 115 are very plane-parallel, wherein the supporting structures also comprise a sufficiently high stiffness for the operation at corresponding environmental influences. This realization provides very good results, as a bend of the mirror structures, or the holding structures to which the mirror structures 110, 115 are attached, would essentially enter one-to-one into the FWHM (full width at half maximum) of the spectrometer 200.

FIGS. 2a-2g show exemplary design options and resulting transmission characteristics of a Fabry-Perot filter element 100 (Fabry-Perot interferometer) as formed by the first and second Fabry-Perot filter stacks 110, 115 described above.

Figure 2A:
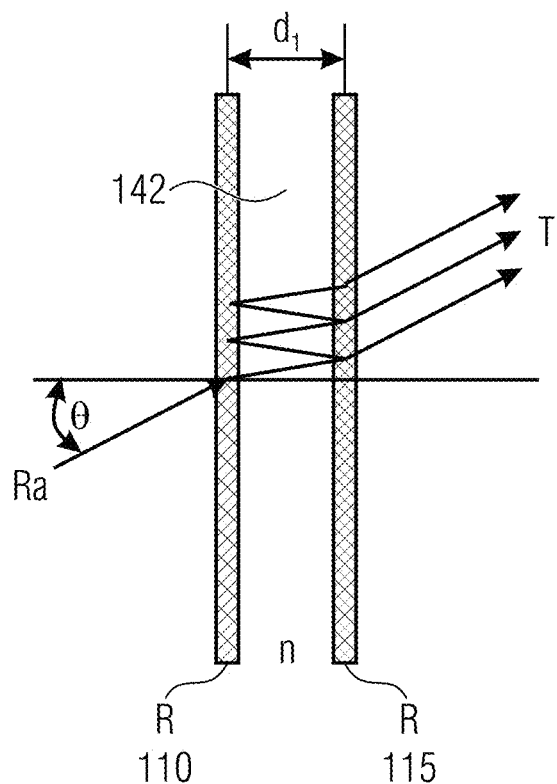
FIGS. 2a-2g show exemplary design options and resulting transmission spectra of a Fabry-Perot filter element (Fabry-Perot interferometer)
Figure 2B:
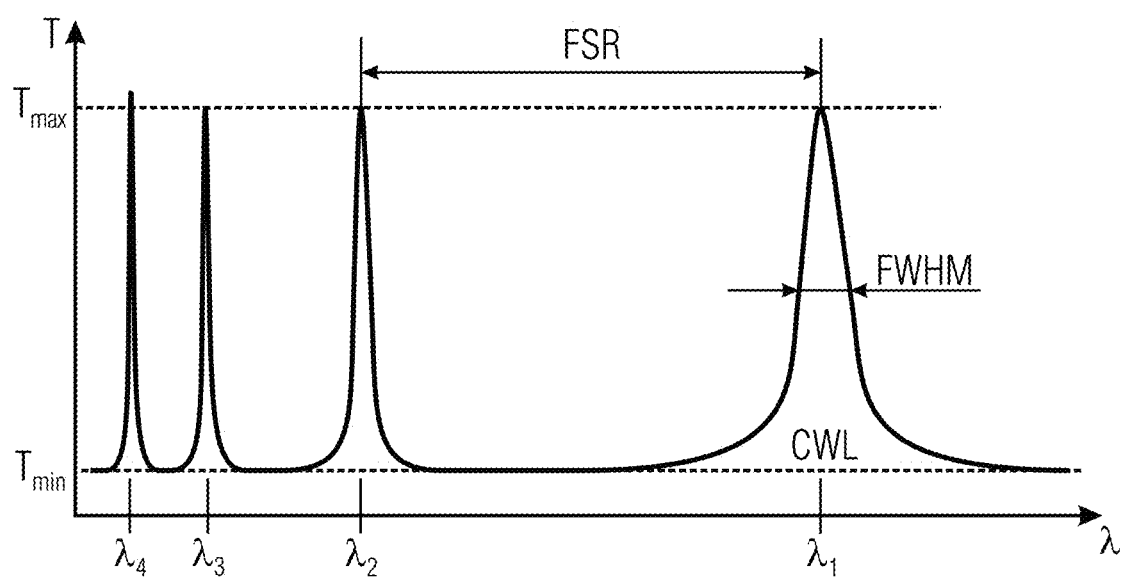

As shown in FIG. 2a, a Fabry-Perot interferometer (FPI) or etalon is typically made of a transparent plate (a spacer 142) having the thickness $d_1$ with two reflecting surfaces 110, 115 or two highly reflecting parallel mirrors 110, 115. The transmission spectrum T as a function of the wavelength (FIG. 2b) exhibits peaks of large transmission $\lambda_1, \ldots, \lambda_4$ corresponding to the resonances of the Fabry-Perot interferometer 100, wherein the free spectral range "FSR" is the spectral region between two successive intensity maxima, wherein the full width at half maximum "FWHM" is the width of a transmission peak measured as the spectral width between the two values left and right from maximum transmission, that have half the transmission value compared to peak transmission, and wherein "CWL" is the center wavelength.

Figure 2C:
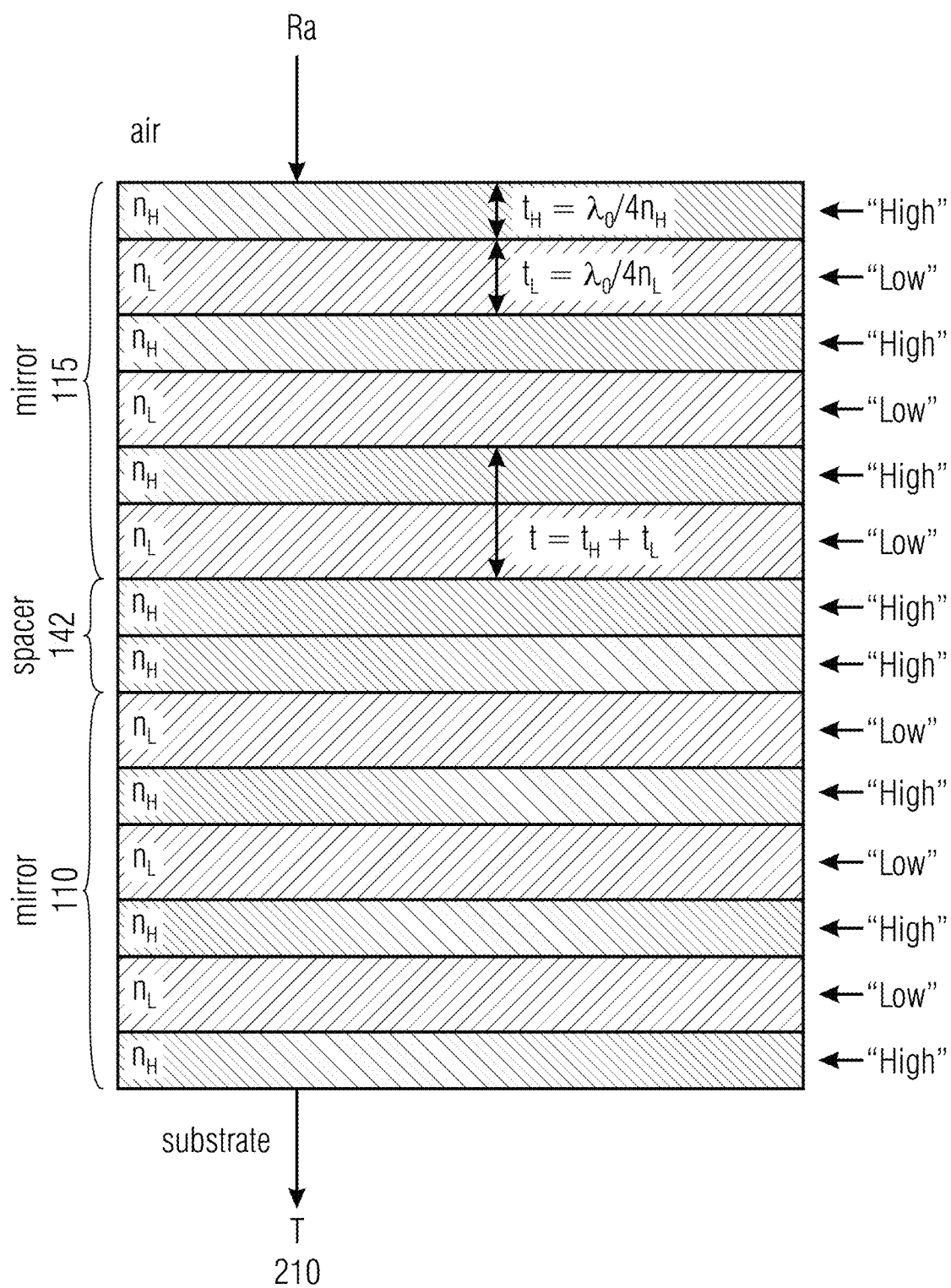

FIG. 2c shows a first and second Fabry-Perot filter stack 110, 115 in form of two quarter wave stacks $LH_n$ combined with the spacer layer 142 between them, wherein the spacer layer 142 has a thickness $d_1$ which corresponds to an integer number of half wavelength λ. Thus, the spacer layer 142 having the thickness $d_1$ is called a Fabry-Perot cavity. The number n indicates the number of pairs of mirror layers LH" having different refractive indices $n_H$, $n_L$ "high-low" and the thickness $t=t_H+t_L$.

Figure 2D:
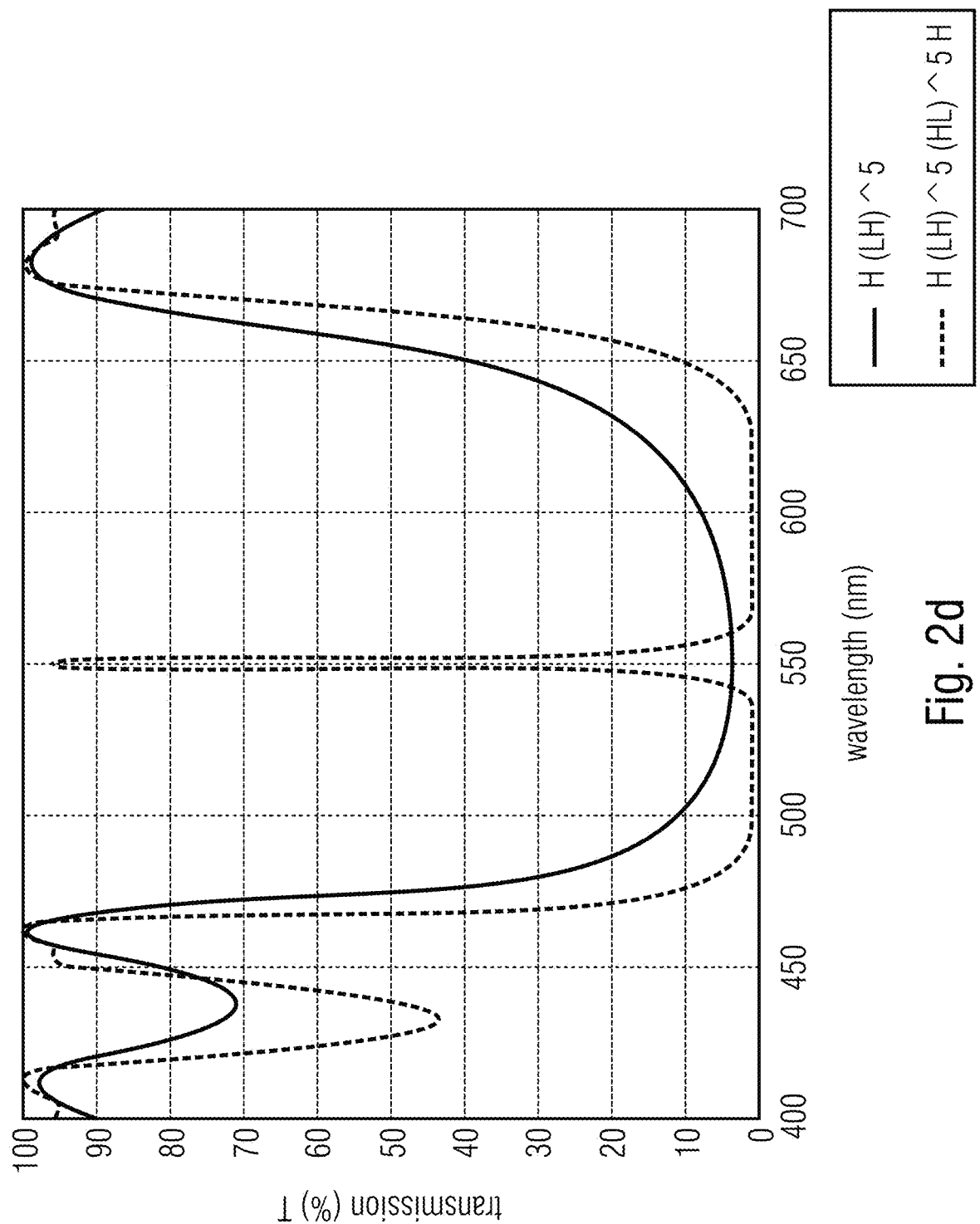

As shown in FIG. 2d, at the center of the stop band $λ_o$, the light (radiation R) constructively interferes in transmission over a very narrow bandwidth.

Figure 2E:
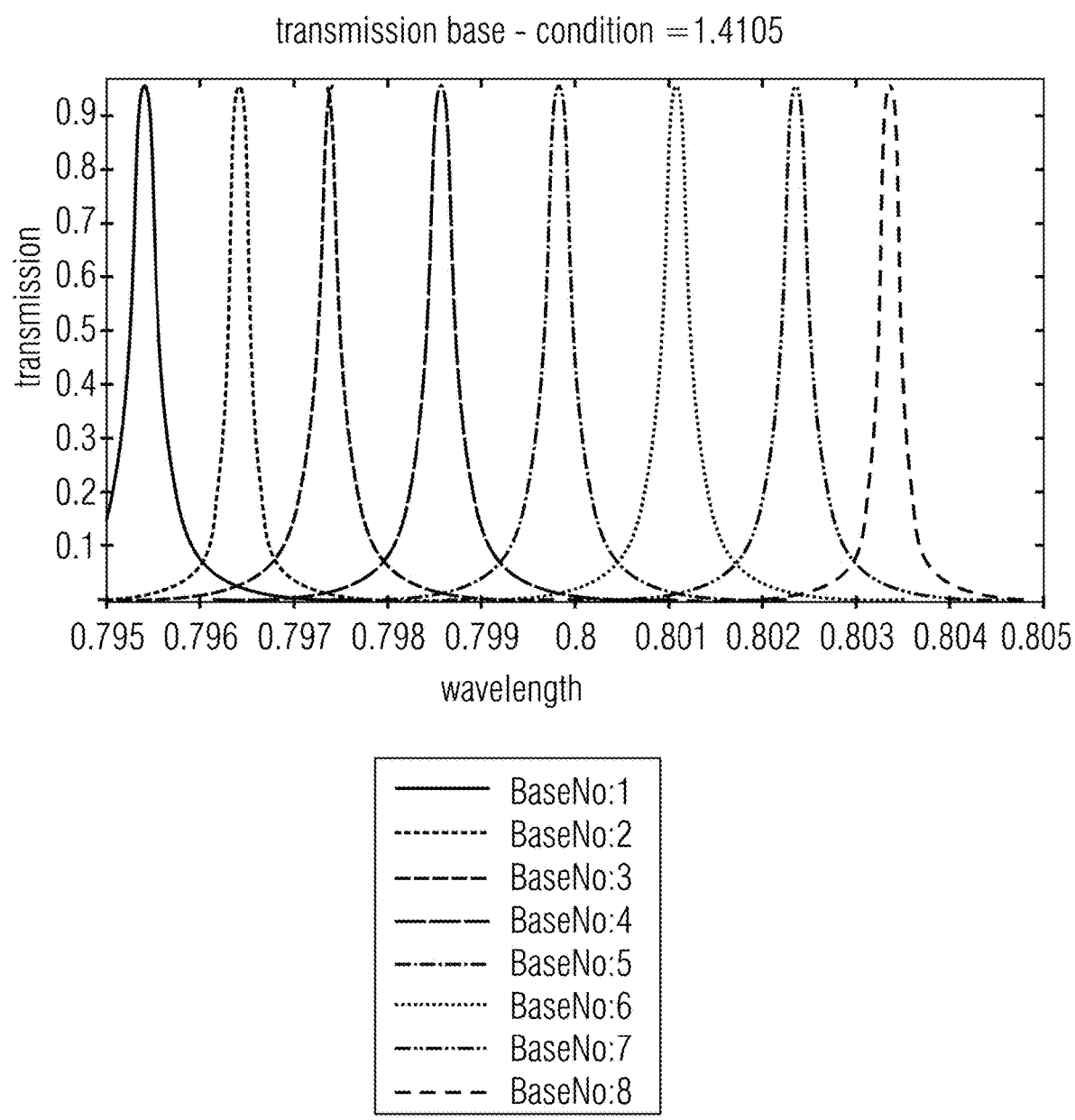

FIG. 2e shows every transmission spectra of a Fabry-Perot filter limit 100 having an FP design with $LH^4$ stacks for the bottom and top mirrors 110, 115. In this connection, it is pointed out that the FWHM can be reduced from above 10 nm to below 1 nm when an $LH^4$ stack is used instead of an $LH^2$ stack.

The filter stack 110, 115 may be a LH" combination. An embodiment is using a stack of silicon oxide and amorphous silicon layers (a-Si). The transmission spectrum for a $LH^4$ stack 110, 115 for bottom and top mirrors 110, 115 is shown in FIG. 2e, with cavity spacings $d_1$ between 440 nm and 447 nm. This would be a suited design for near infrared applications. Here, the spectral full widths at half maximum (FWHM) is far below a nanometer.

The design used in FIG. 2e can easily be fabricated since stack deposition can be done in a single processing step. For applications with relaxed resolution, also n=2 or n=3 designs may be useful. If the resolution should be even better than half a nanometer, the low index layer (silicon oxide) can be replaced by air or vacuum—at least for one or more layers in the stack. The reflectivity R is improved by using a $LH^3$ stack or even a $LH^4$ stack. This results in a better reflection finesse and hence a sharper peak (FWHM—full width at half maximum, and θ is the angle of incidence):

$$FWHM = \frac{1}{2nd\cos\theta}\left(\frac{1-R}{\pi\sqrt{R}}\right)$$

Figure 3B:
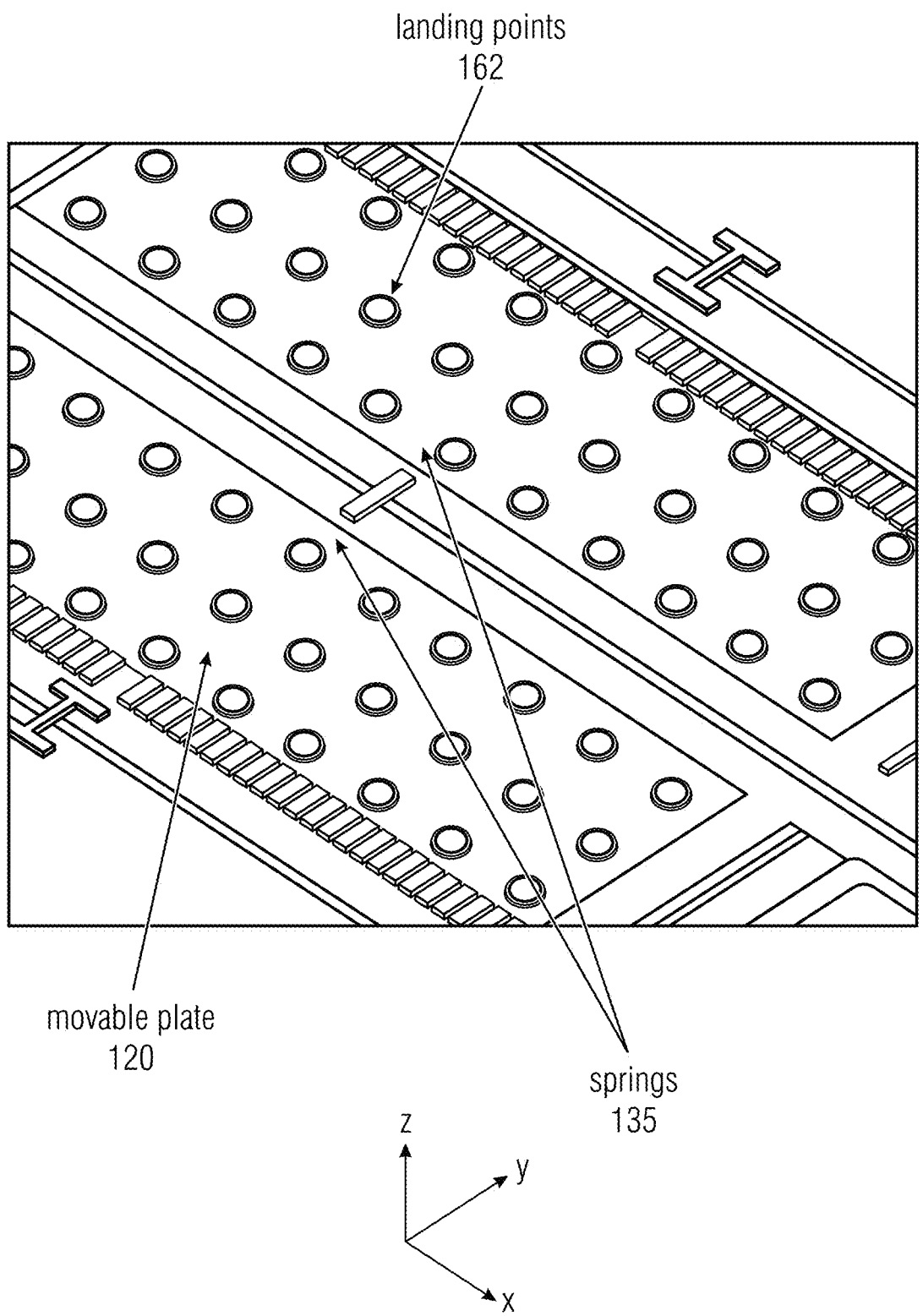
FIGS. 3b-3c show schematic three-dimensional plane views of the integrated, tunable Fabry-Perot filter element of FIG. 3a according to a further embodiment.
Figure 3C:
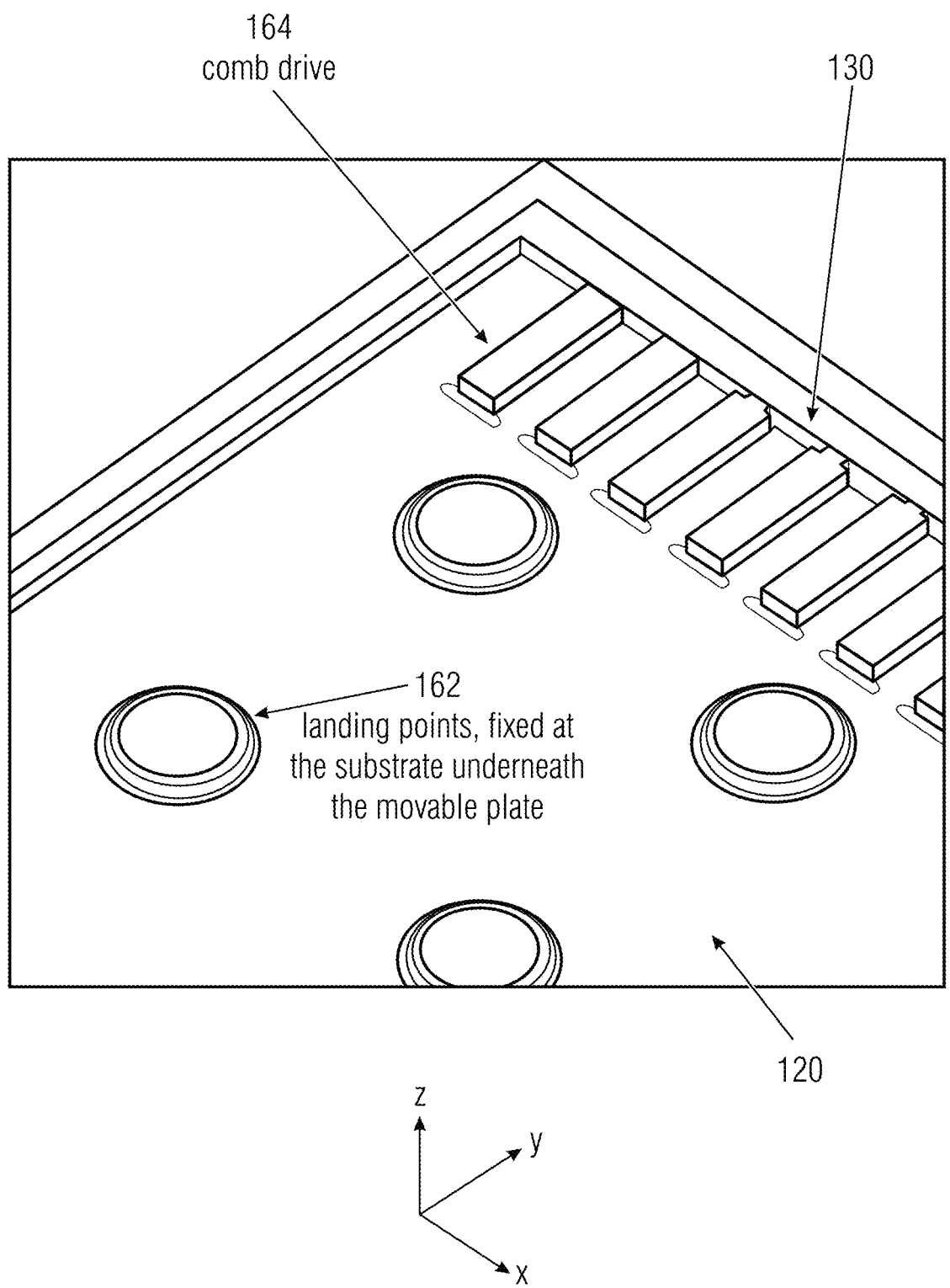

For this purpose, a sacrificial layer process may be used. For stability reasons, a landing pad design may be used. The pads, as shown in FIGS. 3b-3c below, are posts 160 that extend from the SON substrate 130 to the lid 150, wherein a pad design for "air" low index may be placed within the stack itself.

Figure 2F:
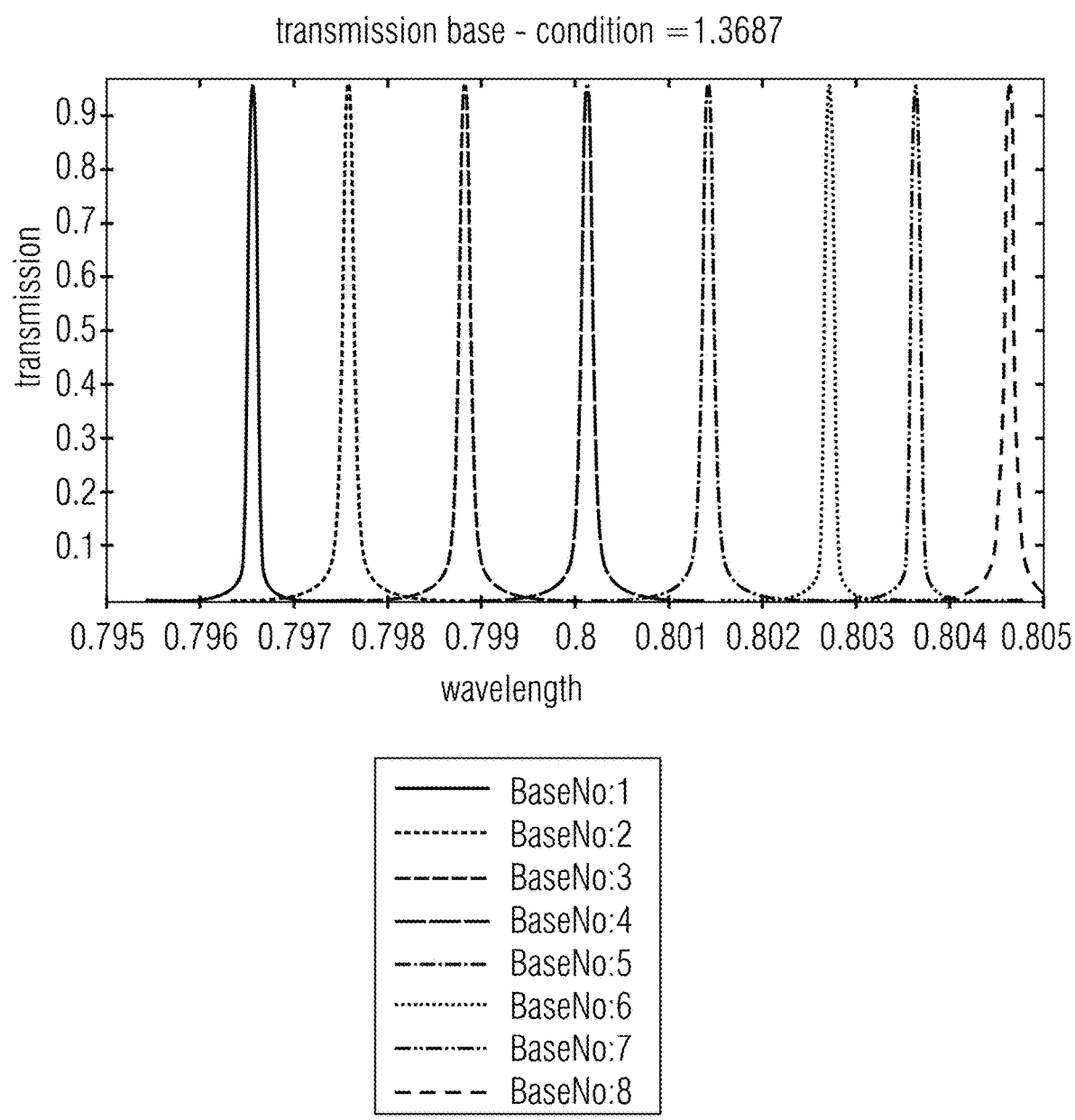

As shown in FIG. 2f, exemplary transmission spectra of a Fabry-Perot design with $LH^4$ stacks for bottom and top mirrors 110, 115 are shown, wherein for the spacer 142 comprises air (a gas) or a (near) vacuum instead of a middle oxide layer. This design provides a very high resolution with an FWHM of approximately 100 pm. This leads to a drastic reduction of FWHM to approximately 100 pm. In this region of resolution, even Raman spectroscopy is in reach.

Figure 2G:
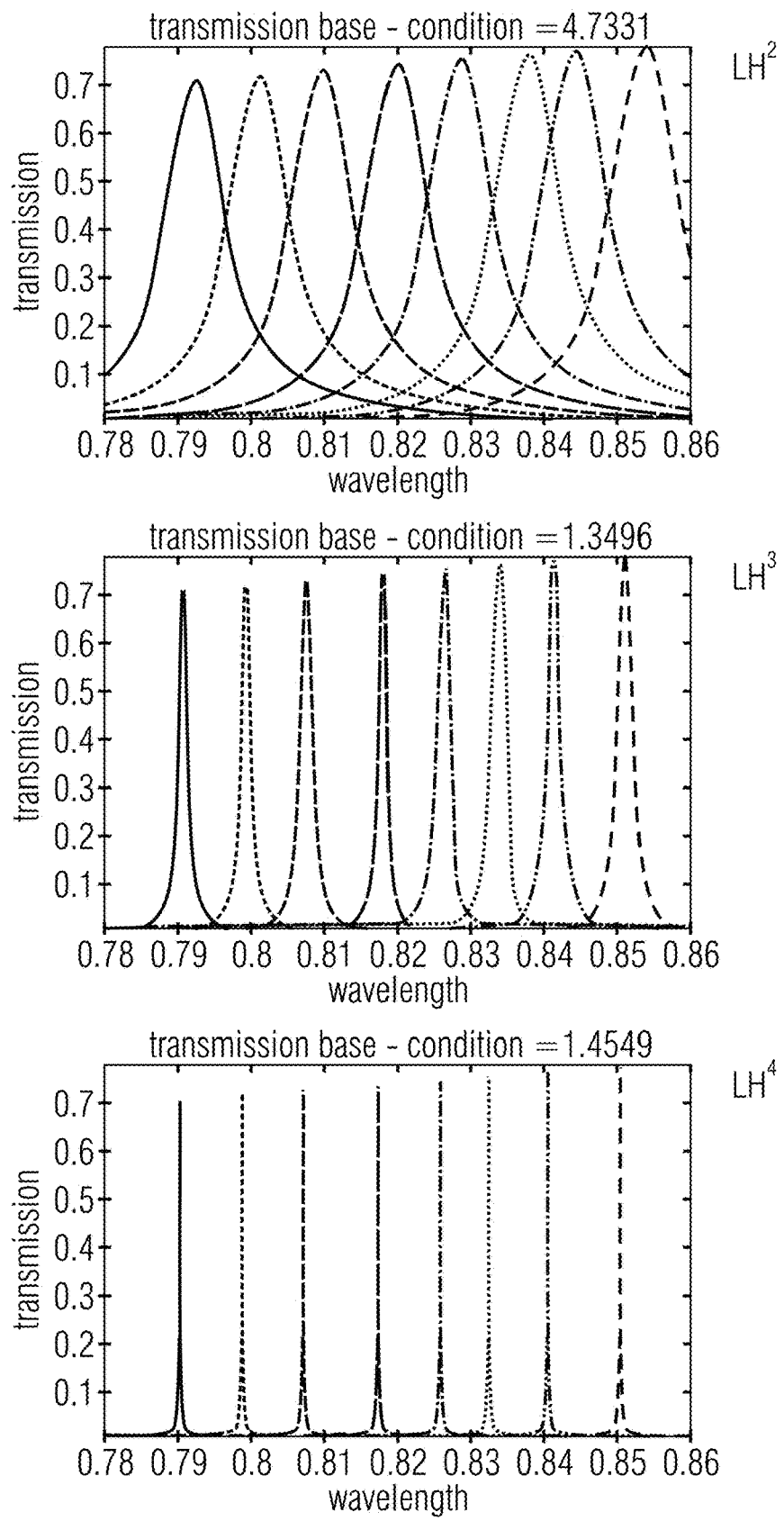

FIG. 2g shows embodiments with an implementation of improved mirror stacks 110, 115, wherein the exemplary simulations of FIG. 2g show that for $LH^2$, $LH^3$ and $LH^4$ stacks 110, 115 (e.g., stacks made of 50 nm a-Si and 120 nm Oxide, with 277 nm . . . 313 nm spacer oxide in approx. 5 nm steps), the continuous reduction of FWHM is visible. Thus, the FWHM is reduced from above 10 nm to below 1 nm when an $LH^4$ stack is used instead of an $LH^2$ stack.

In the following, a number of different possible implementations of the integrated, tunable Fabry-Perot filter elements 100 are exemplarily described. In the present description of embodiments, the same or similar elements having the same structure and/or function are provided with the same reference numbers or the same name, wherein a detailed description of such elements will not be repeated for every embodiment.

FIG. 3a shows a schematic cross-sectional view of an integrated, tunable Fabry-Perot filter element 100 according to a further embodiment.

As shown in FIG. 3a, the tunable Fabry-Perot filter element 100 comprises the first and second Fabry-Perot filter stacks 110, 115. The first Fabry-Perot filter stack 110 is arranged at the movable first carrier element 120. The second Fabry-Perot filter stack 115 is arranged at a second carrier element 125. Upon an actuation, the first carrier element 120 with the first Fabry-Perot filter stack 110 is vertically movable with respect to the second carrier element 125 with the second Fabry-Perot filter stack 115, for adjusting the distance $d_1$ between the first and second opposing Fabry-Perot filter stacks 110, 115. The movable first carrier element 120 is formed as an SON structure 120 in an SON substrate 130, wherein the SON structure 120 is movably suspended by means of mechanical spring elements 135 to the SON substrate 130.

As shown in FIG. 3a, the integrated, tunable Fabry-Perot filter element 100 further comprises pillar elements 160, the pillar elements 160 may extend through the movable first carrier element 120 and the first Fabry-Perot filter stack 110 and may extend between the semiconductor material of the SON substrate 130 (at the SON cavity 140) and the lid element 150, wherein the pillar elements 160 are mechanically coupled between the SON substrate 130 and the lid element 150 and are mechanically decoupled from the movable first carrier element 120 with the first Fabry-Perot filter stack 110. Thus, the movable first carrier element 120 is still movable and displaceable with respect to the second carrier element 125.

FIGS. 3b-3c show schematic 3D SEM (SEM=scanning electron microscope) plane views of the movable first carrier element 120 of the integrated, tunable Fabry-Perot filter element of FIG. 3a according to a further embodiment. As shown in FIG. 3b, the pillar elements 160 may extend through the movable first carrier element 120 and end at landing points 162 which are fixed at the substrate 130 underneath the movable plate 120. The pads, as shown in FIGS. 3b-3c, are posts 160 that extend from the SON substrate 130 to the lid 150.

Thus, the concept of SON structures 120 also provides the possibility to use landing points 162 for the sealing in between the movable part 120 to support a stiff layer (=movable first carrier element 120) with a highly defined position.

A further shown in FIGS. 3b-3c, the Fabry-Perot filter element 100 may comprise a sideways comp drive structure 164, e.g., in form of an interdigital structure laterally arranged between the first carrier element 120 (SON structure) and the laterally surrounding semiconductor material of the SON substrate 130 for capacitively sensing (=a capacitive position sensing) the vertical distance $d_1$ between the first and second opposing Fabry-Perot filter stacks 110, 115.

To summarize, by inserting so-called "columns" 160 between the substrate 130 bottom and through the movable element 120 to the upper supporting structure (supporting lid) 150, a stiff (low bulge) top structure 125 may be realized. Thus, this mechanical stiffening comprises the columns 160 that may be arranged, e.g., at a distance of 30 μm or of 20 to 40 μm, wherein an oxide top structure 125 with a thickness of 5 µm or of 3 to 10 µm is sufficient to ultimately obtain a sufficiently stiff top structure 125 with the second filter stack 115 arranged thereon. The distance between the column elements 160 may be adapted to the manufacturing technology and to the dimensions (footprint) of the moving element 120.

With the present concept for stiffening the top structure 125, a bend or warpage of less than or equal to 10 nm or less than or equal to 1 nm may be achieved, while, depending on the edge length of the freely movable element (=first carrier element) 120, a bend or warpage of the same may be obtained in the range of some 1 to 10 nm (with an edge length of some millimeters).

For example, the footprint of the moving first carrier element 120 depends on the area required for the photodiode arrangement 210, wherein, the better the SNR of the photodiode arrangement 210, the smaller the area of the freely moving first carrier element 120 and therefore of the FP resonator 100 may be formed.

Thus, the area required for the photodiode arrangement 210 for achieving a sufficient SNR (signal to noise ratio) determines the area required for the FP filter 100.

Figure 4:
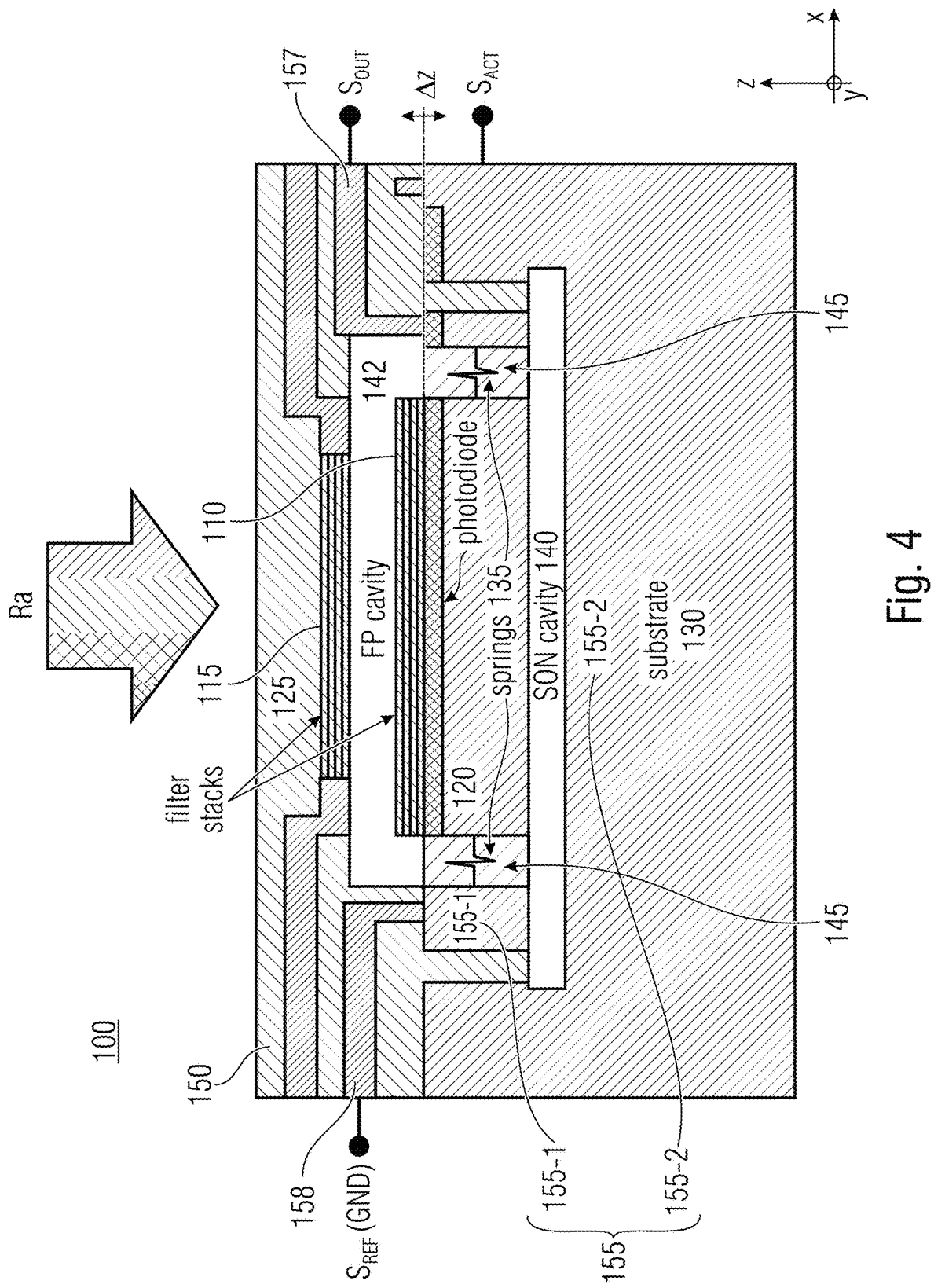
FIG. 4 shows a schematic cross-sectional view of an integrated, tunable Fabry-Perot filter element according to a further embodiment.

FIG. 4 shows a schematic cross-sectional view of an integrated, tunable Fabry-Perot filter element 100 according to a further embodiment.

As shown in FIG. 4, the tunable Fabry-Perot filter element 100 comprises the first and second Fabry-Perot filter stacks 110, 115. The first Fabry-Perot filter stack 110 is arranged at the movable first carrier element 120. The second Fabry-Perot filter stack 115 is arranged at a second carrier element 125. Upon an actuation, the first carrier element 120 with the first Fabry-Perot filter stack 110 is vertically movable with respect to the second carrier element 125 with the second Fabry-Perot filter stack 115, for adjusting the distance $d_1$ between the first and second opposing Fabry-Perot filter stacks 110, 115. The movable first carrier element 120 is formed as an SON structure in an SON substrate 130, wherein the SON structure 122 is movably suspended by means of mechanical spring elements 135 to the SON substrate 130.

As further shown in FIG. 4, the first electrostatic electrodes (the first electrode structure) 155-1 is a conductive layer within the movable first carrier element 120, e.g., in form of a conductive layer within the first Fabry-Perot filter stack 110 and/or a conductive layer (doping region) within the semiconductor material of the first carrier element 120, wherein the second electrostatic electrode (second electrode structure) 155-2 is arranged as a conductive region in the semiconductor material of the SON substrate 130, e.g., vertically below the SON cavity 140.

The displacement Δz between the first and second carrier elements 120, 125 and thus between the first and second Fabry-Perot filter stacks 110, 115 can also be provided by an electrostatic actuator having the first and second electrode structures 150-1, 150-2, wherein the second electrode structure 155-2 is formed as a bottom electrode in the semiconductor material of the SON substrate, e.g., below the SON cavity 140.

According to the embodiment of FIG. 4, the fixation of the spring elements 135 comprises an isolating material, e.g., silicon oxide, for providing an electrical isolation between the semiconductor material of the first carrier element 120 (SON structure) and the remaining semiconductor material of the SON substrate 130. Thus, the conductance of the semiconductor material of the first carrier element 120 forms the first electrode structure 155-1, wherein the remaining semiconductor material (or a doped region) of the SON substrate 130 forms the second electrode structure (counter-electrode) 155-2 of the resulting capacitive structure 155 which is effective as the electrostatic actuator 155.

This implementation of the electrostatic actuator 155 with the first and second electrode structures 155-1, 155-2 offer a relatively simple sealing process for providing the capping structure 150, as there is no need for providing an electrode structure in the capping structure (sealing stack) 150.

According to a further embodiment, an alternative electrode structure 155-1 may be a conductive layer within the filter stack (conductive silicon or amorphous silicon) 110 or 115.

Figure 5:
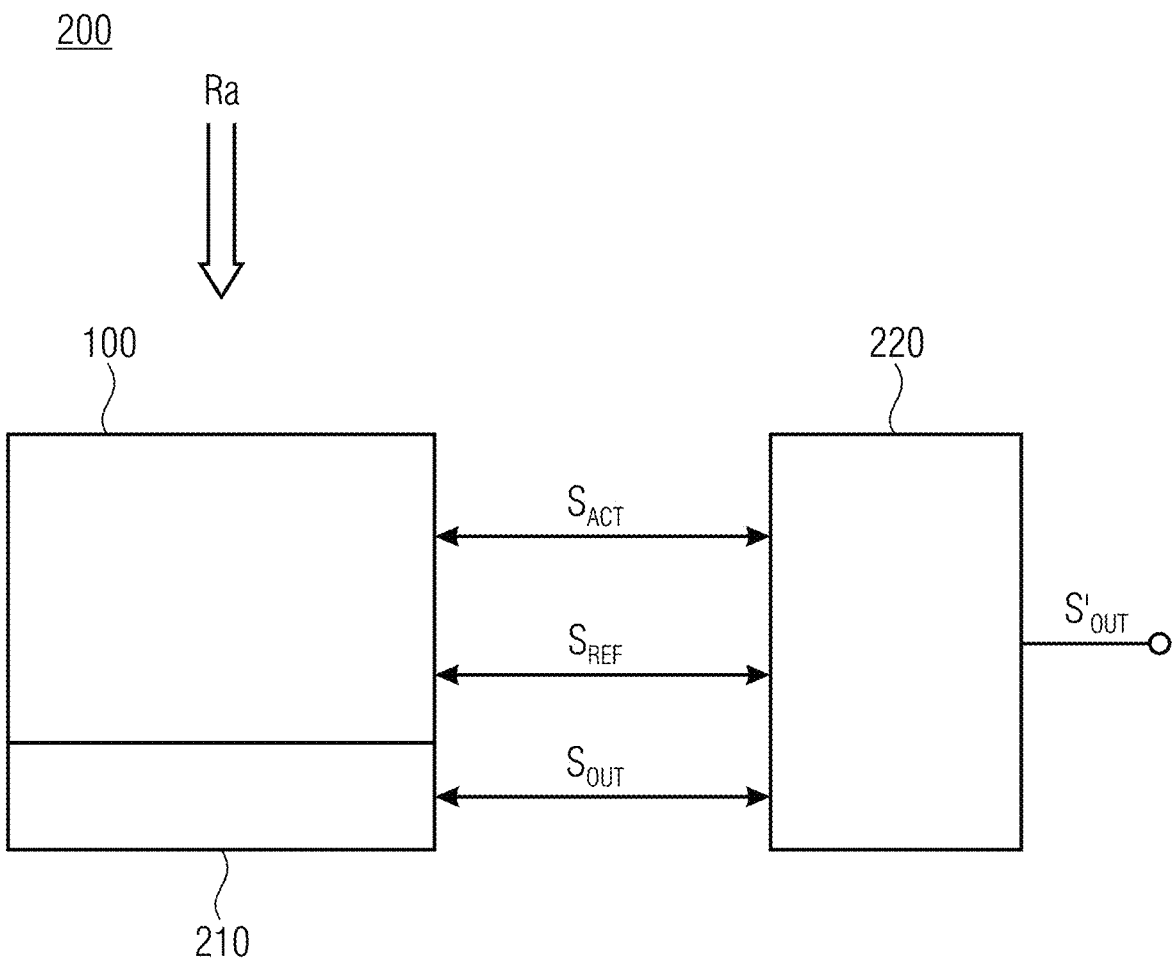
FIG. 5 shows a schematic cross-sectional view of a Fabry-Perot spectrometer device having an integrated, tunable Fabry-Perot filter element according to a further embodiment.

FIG. 5 shows a schematic diagram of a spectrometer device (spectrometric device) 200. The spectrometer device 200 comprises the integrated, tunable Fabry-Perot filter element 100 as described in FIGS. 1 to 4 above. The spectrometer device 200 further comprises an optical detector 210 which is arranged in an illumination direction of the radiation Ra downstream to the integrated, tunable Fabry-Perot filter element 100, e.g., at the movable, first carrier element 120 between the first Fabry-Perot filter stack 110 and the movable first carrier element 120. Furthermore, the spectrometer device 200 may comprise a processing unit 220 (e.g., a control- and readout circuit) to provide the actuator 155 with an actuation signal $S_{ACT}$ and e.g., with the reference signal $S_{REF}$ for controlling the distance $d_1$ between the first and second Fabry-Perot filter stacks 110, 115 and, for example, for reading out the optical detector 210 for providing an output signal $S'_{OUT}$ which corresponds to the output signal $S_{OUT}$ of the optical detector 210 or is derived from the output signal $S_{OUT}$ of the optical detector 210.

In the following, FIGS. 6 and 7a-f show exemplary process flows for manufacturing a tunable Fabry-Perot filter element 100 according to an embodiment. In general, the process flow may comprise a FEOL process (FEOL=front end of line) and a subsequent BEOL process (BEOL=backend of line). Typically, the FEOL-process comprises the preparation and treatment of the semiconductor substrate 130, whereupon during a back end of line (BEOL) process a capping structure 150 (=BEOL stack) having metallization structures 154, which are separated by and/or embedded in an insulation material, may be applied on the semiconductor substrate 130. Thus, the BEOL-process may comprise building the capping structure 150 having a horizontal stack 150 of metallization structures, e.g., metal layers or metal lines, and intermediate dielectric layers.

FIG. 6 shows an exemplary process flow (flowchart) of the method 300 of manufacturing a tunable Fabry-Perot filter element 100 according to an embodiment.

In step 310, a first FP filter stack 110 is formed on a SON substrate 130.

In step 320, a movable first carrier element 120 is formed as a SON structure in the SON substrate 130, wherein the SON structure 120 is movable suspended by means of mechanical spring elements 135 to the SON substrate 130.

In step 330, a sacrificial layer 170 is formed for covering the first FP filter stack 110 on the SON substrate 130.

In step 340, a second FP filter stack 115 is formed on the sacrificial layer 170.

In step 350, a capping structure 150 on the sacrificial layer 170, the capping structure 150 having an opening 152 for providing access to the sacrificial layer 170.

In step 360, an actuation structure 150 is formed, which is coupled to the movable first carrier element 120 for adjusting the distance $d_1$ between the first and second opposing FP filter stacks 110, 115 upon an actuation signal $S_{ACT}$.

In step 370, the sacrificial layer 170 is removed through the opening 152 of the capping structure 150 so that the first carrier element 120 with the first FP filter stack 110 is vertically movable with respect to the second carrier element 125 with the second FP filter stack 115.

According to an embodiment, the step 360 of forming the actuation structure 150 may comprise the step of forming an electrostatic actuator, an piezoelectric actuator and/or a thermal actuator having a thermal bending structure, which is mechanically and/or electrically coupled to the movable first carrier element 120 for adjusting the distance $d_1$ between the first and second opposing FP filter stacks 110, 115.

According to an embodiment, the method may further comprise a step of forming an optical detector 210 which is arranged in an illumination direction downstream to the integrated, tunable FP filter element 100.

According to embodiments, the method may further comprise steps of forming the lid (capping) element 150, pillar elements 170 and/or a comb drive 164.

In the present concept, the thickness of the FP cavity 142, i.e., the exact distance $d_1$ between the filter stacks 110, 115, is defined by the sacrificial layer 170 that may be applied in an extremely precise manner, e.g., in the single-digit nanometer range. Furthermore, since a removal of the sacrificial layer 170, e.g., containing carbon, may be carried out by means of ashing, very exact surfaces may be obtained for the filter stacks 110, 115 to be applied and/or the FP cavity 142 resulting therefrom, in contrast to the removal of the sacrificial layer 170 by wet-etching. With the illustrated procedure, a flow-through spectrometer 200 with an integrated tunable FP filter 100 may be realized on or next to an ASIC 220 with a relatively small space requirement.

In the following, FIGS. 7a-f show schematic cross-sectional views ("schematic snapshots") of a semiconductor substrate 130 during different stages of the method 300 for manufacturing a tunable Fabry-Perot filter element 100 according to an embodiment. Thus, FIGS. 7a-f show an exemplary process flow or flowchart of the method 300 for manufacturing the integrated, tunable Fabry-Perot filter element 100.

With respect to the method 300 as shown in FIGS. 7a-f, it is pointed out to the fact that this process flow is one example of multiple ways of how to fabricate the integrated, tunable Fabry-Perot filter element 100 and the spectrometric device 200, wherein the various processing steps can be executed in a different order or combined with additional fabrication steps and/or structuring techniques.

Figure 7A:
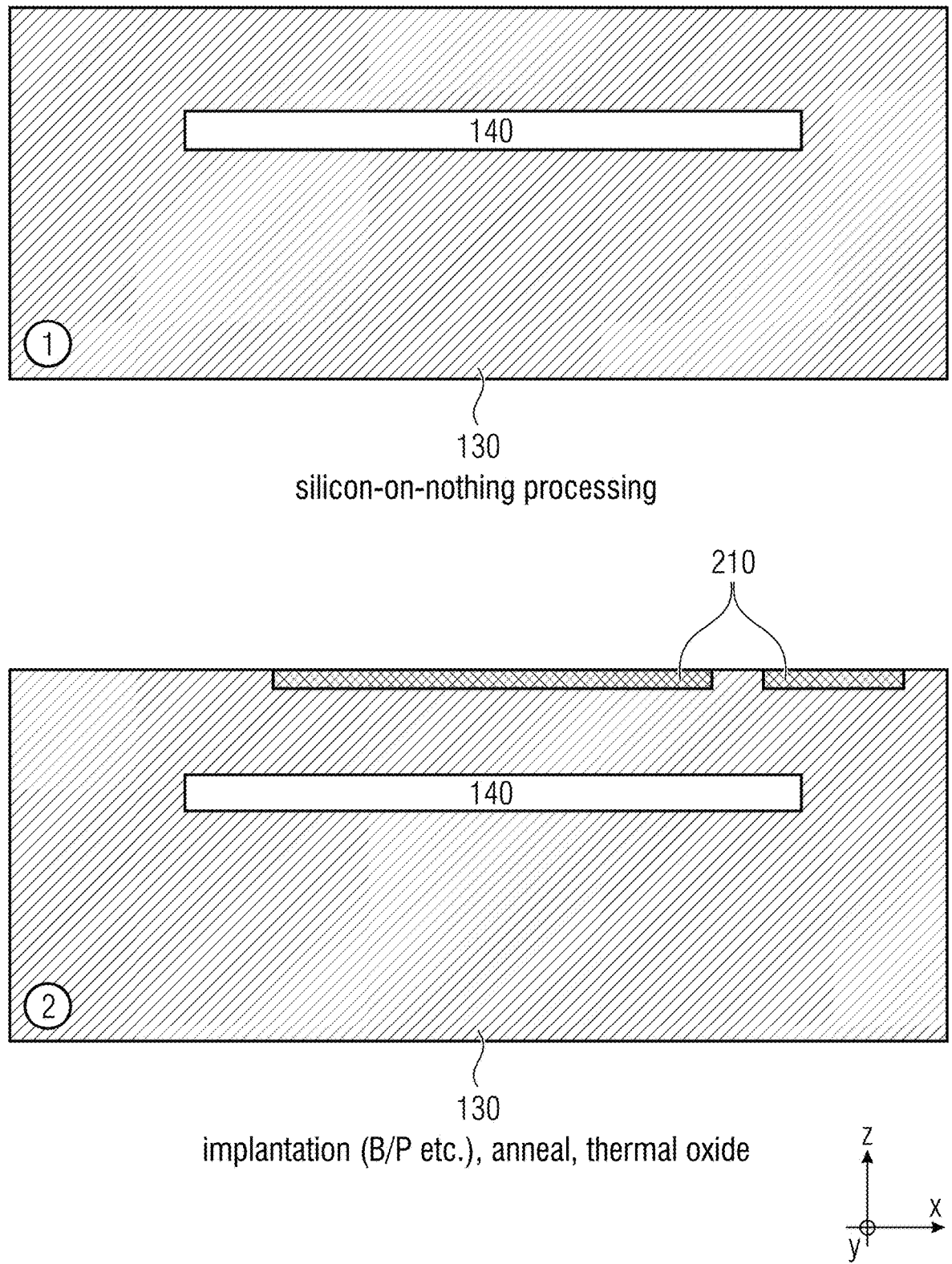
FIGS. 7a-f show schematic cross-sectional views (schematic snap shots) of a semi-conductor substrate and exemplary manufacturing steps for manufacturing a tunable Fabry-Perot filter element and/or a spectrometer device having such a tunable Fabry-Perot filter element at different stages of the manufacturing process according to an embodiment.

As shown in step 1 of FIG. 7a, a silicon-on-nothing processing is conducted with respect to a semiconductor substrate 130. The silicon-on-nothing processing of step 1 may comprise a Venezia process for forming the SON cavity 140 in the semiconductor material of the SON substrate 130.

In step 2 of FIG. 7a, the optical detector 210, e.g., a photodiode arrangement or array, may be formed in a first main surface region 130-a of the SON substrate 130. Thus, step 2 of forming the optical detector may comprise implantation steps, annealing steps, thermal oxide to position steps, etc.

Figure 7B:
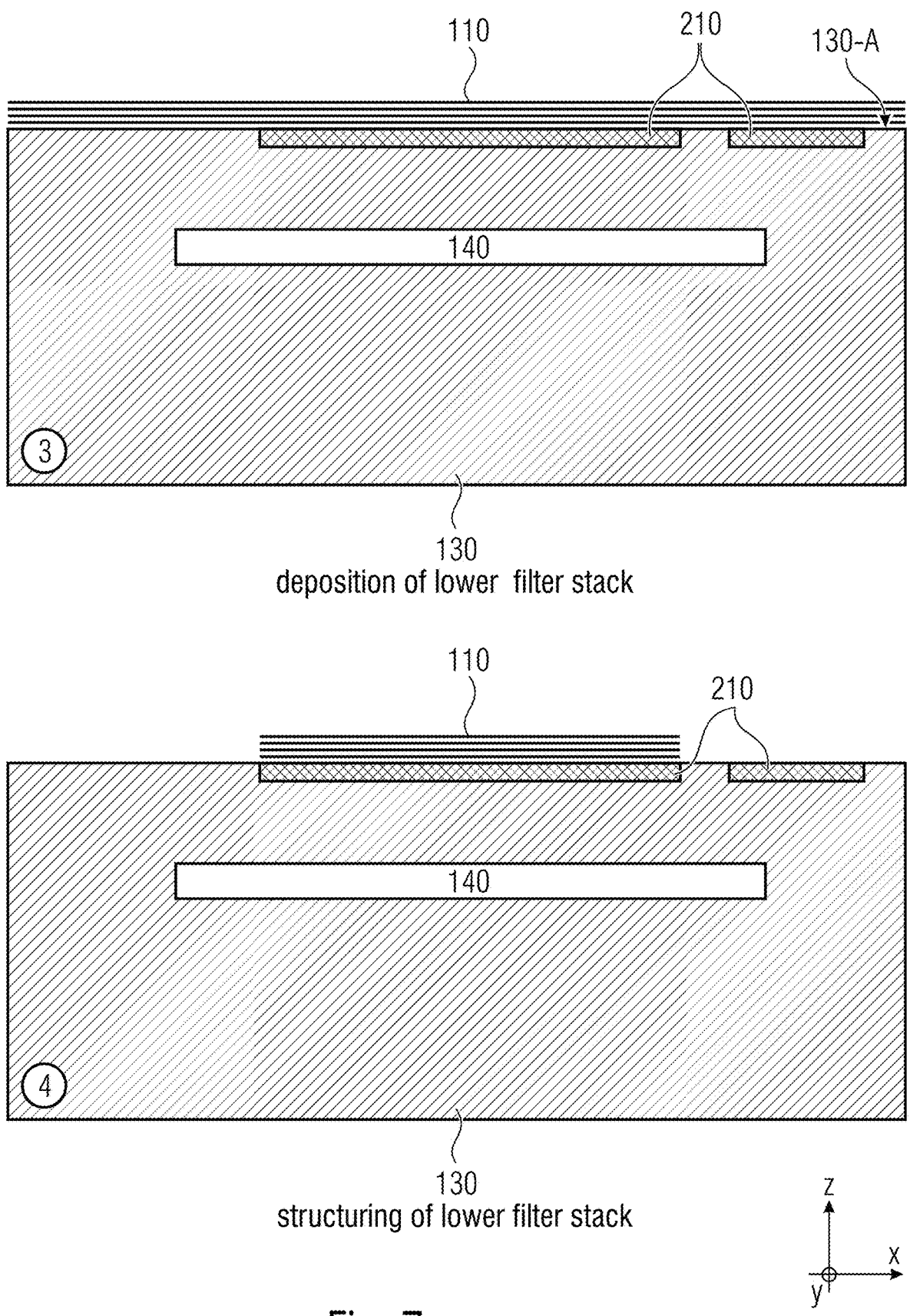

In step 3 of FIG. 7b, a (continuous) first Fabry-Perot filter stack 110 is formed/deposited as the lower filter stack on the first main surface region 130-A of the SON substrate 130.

In step 4 of FIG. 7b, the first Fabry-Perot filter stack 110 is structured so that the structured first Fabry-Perot filter stack 110 is arranged with respect to a projection vertical to the first main surface region 130-A within the lateral extension of the cavity 140 in the SON substrate 130. Thus, steps 3 and 4 (or 1 to 4) of FIGS. 7a and 7b may correspond to step 310 of FIG. 6.

In step 5 of FIG. 7c, a deep trench etching process together with a mechanical spring structuring process is performed to form the trench structure 145 from the first main surface region 130-A of the SON substrate to the SON cavity 140 and for forming the mechanical spring element(s) 135 between the SON structure (movable first carrier element) 120 and the lateral surrounding SON substrate 130. Thus, the trench structure 160 surrounds the movable first carrier element 120 and is mechanically connected by means of the mechanical spring elements 135 to the laterally surrounding SON substrate 130. Thus, step 5 of FIG. 7c may correspond to step 320 of FIG. 6.

In step 6 of FIG. 7c, a sacrificial layer 170 is deposited for covering the first Fabry-Perot filter stack 110 on the movable first carrier element 120 of the SON substrate 130. According to sacrificial layer deposition processes, the sacrificial layer 170 can be applied with a very precise thickness which corresponds to the spacer 142 having the thickness $d_1$ of the Fabry-Perot filter element 100 to be formed. Thus, step 6 of FIG. 7c may correspond to step 330 of FIG. 6.

Figure 7:
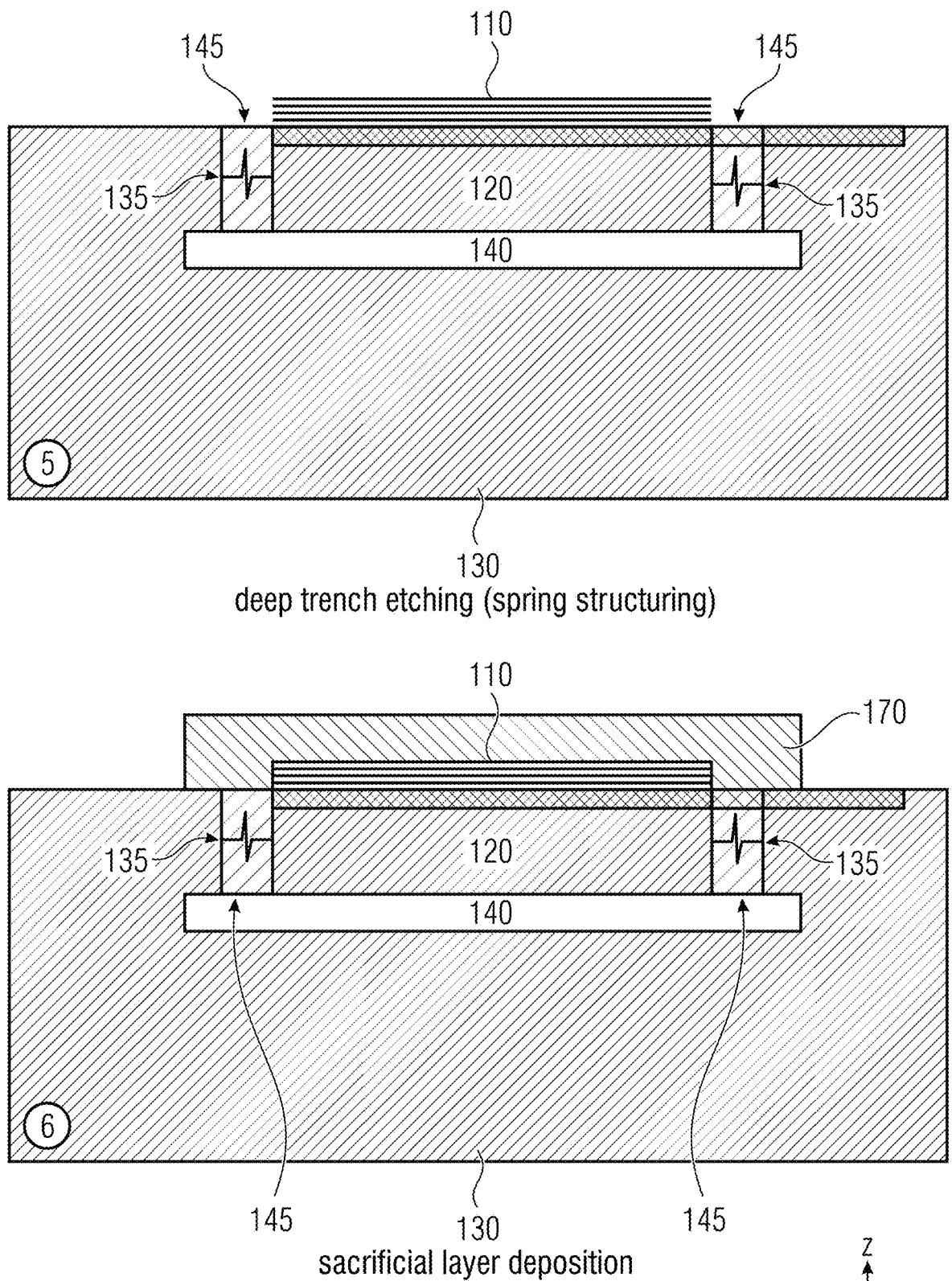
Figure 7D:
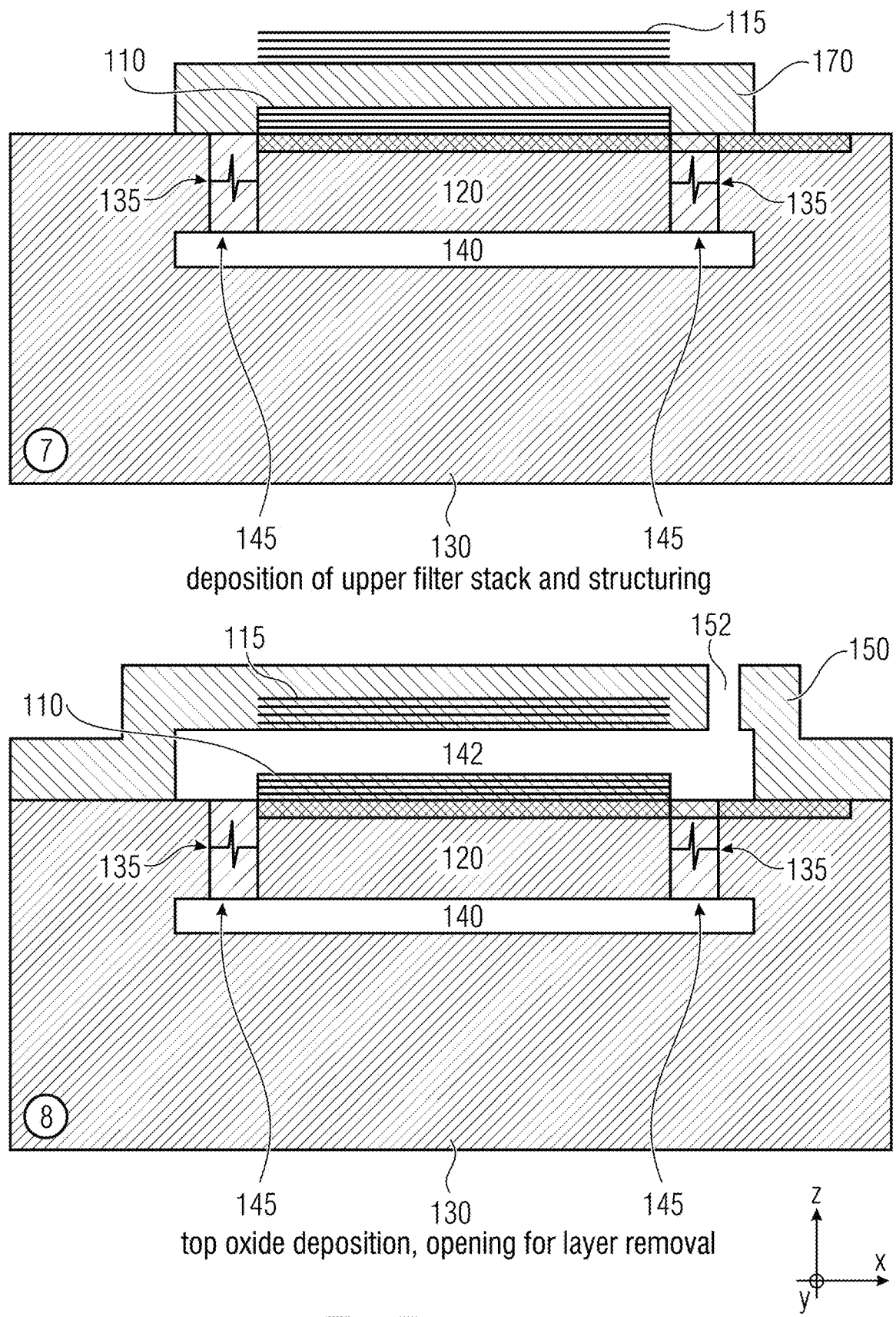

In step 7 of FIG. 7d, the second Fabry-Perot filter stack 115 is formed on the sacrificial layer 170. To be more specific, the "upper" Fabry-Perot filter stack 115 is deposited on the sacrificial layer 170 and then structured. Thus, step 7 of FIG. 7d may correspond to step 340 of FIG. 6. The sacrificial layer 170 may comprise a carbon or silicon dioxide material. Typical deposition processes may comprise a CVD process (CVD=chemical vapor deposition).

In step 8 of FIG. 7d, a further insulating material 150, e.g., an oxide material, is deposited, e.g., by a CVD process, on the "processing surface", i.e., e.g., on the deposited sacrificial layer 170 and the exposed regions of the SON substrate 130 on the first main surface region 130-A thereof (=Top oxide deposition).

Moreover, in step 8 of FIG. 7d an access hole or a plurality of access holes 152 are formed, e.g., etched, in the further insulation material 150 for achieving access openings to the sacrificial material 170. The at least one access hole 152 provides an access port for an etchant to the sacrificial material 170 in the cavity 142.

Figure 7E:
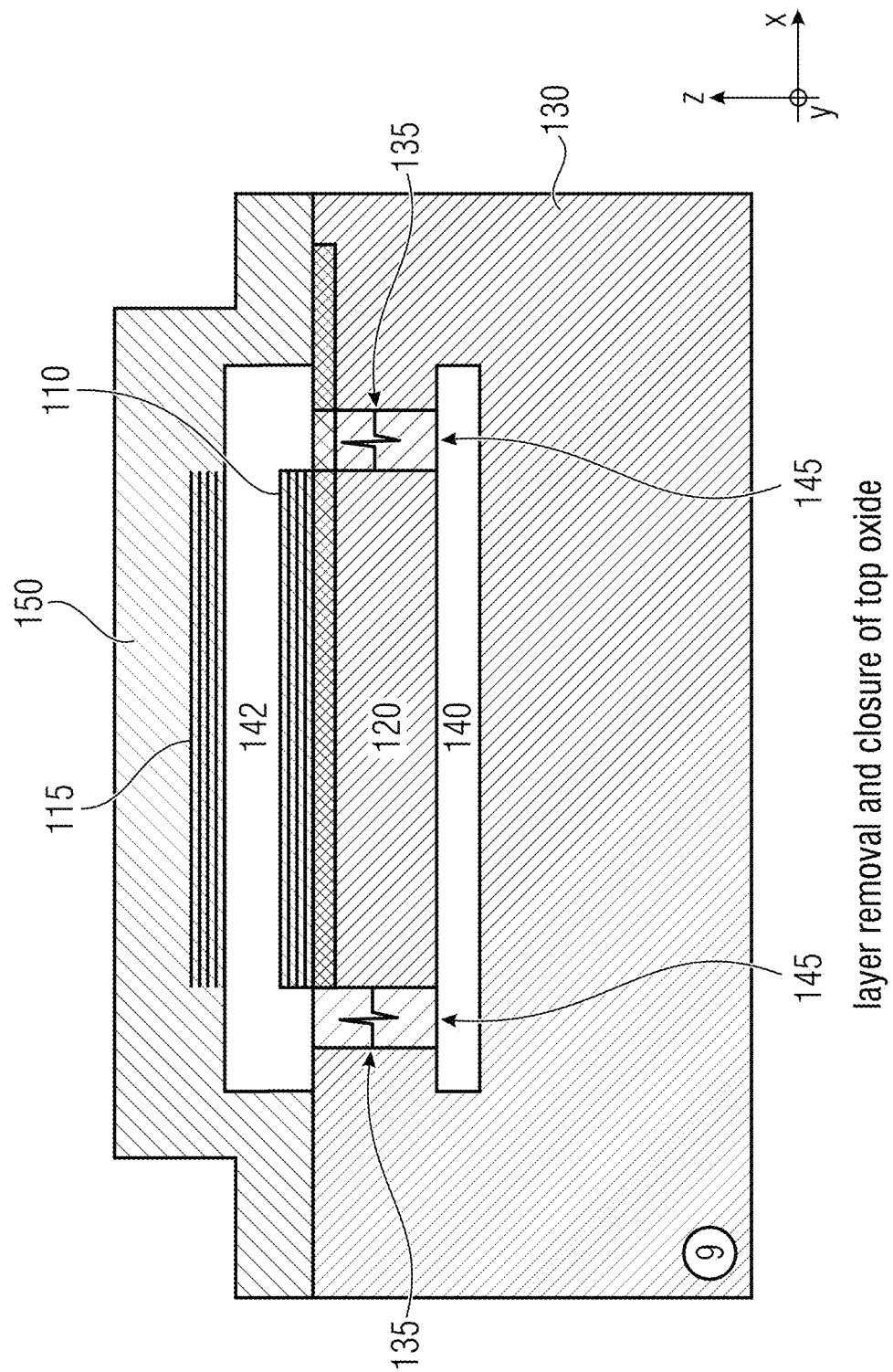
Figure 7:
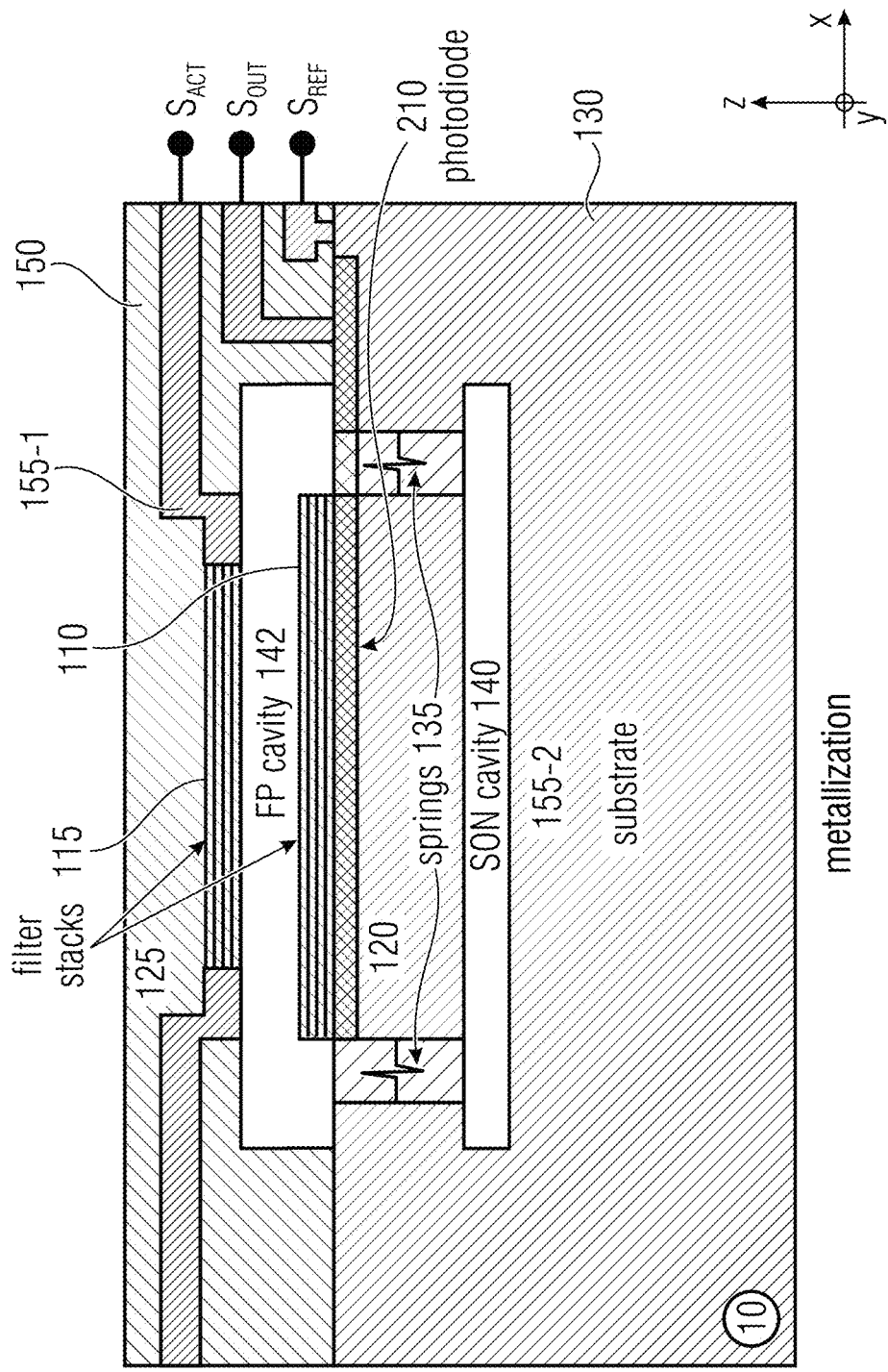

In step 9 of FIG. 7e, the sacrificial layer 170 is finally removed through the release opening 175 to provide the cavity 142. Thus, step 9 of FIG. 7e may correspond to step 370 of FIG. 6.

In step 9 of FIG. 7e (after the sacrificial layer removal), a sealing material 150, e.g., the insulating material (top oxide) is deposited on the momentary processing surface for closing the access opening(s) 152 in the insulating material 150. The step 9 of closure of the top oxide may comprise a deposition of the insulation material with a CVD process or an HDP-CVD process (HDP=high density plasma) on the previously applied insulation material for sealing the cavity 144 (having the SON cavities 140 and 142) under low pressure or near vacuum, wherein the low pressure in the cavities 140, 142 corresponds to the processing pressure of the CVD process or the HDP-CVD process so that the hermetically sealed cavity 144 is formed below the capping structure 150. Thus, step 9 of FIG. 7e may correspond to step 350 of FIG. 6.

The capping structure 150 may comprise a silicon oxide or silicon nitride material. Moreover, the CVD process or HDP-CVD process may comprise a process pressure between 0.1 and 13 mTor, between 0.5 and 10 mTor or between 1 and 3 mTor.

In step 10 of FIG. 7f, a metallization 154 is formed in and/or on the capping structure 150 for connecting the different electrical components of the Fabry-Perot filter element 100. Thus, step 10 of FIG. 7f may correspond to step 360 of FIG. 6.

According to an embodiment, the metallization 154 is formed as one component within the capping structure 150 before the sacrificial layer 170 is removed. According to an embodiment, the capping structure (=BEOL stack) 150, including the metallization 154, may be formed before the holes 152 for accessing the sacrificial layer 170 are formed. Then, the sacrificial layer 170 is removed and the holes 152 are closed for providing the sealed cavity 144, for example.

The properties of the structure and the manufacturing process 300 of the tunable Fabry-Perot filter element 100 can be summarized as follows:

The movable first carrier element 120, i.e., the SON silicon plate 120 provides a very stiff, stress-free and ideally flat support for the first Fabry-Perot filter stack (bottom filter stack) 110. The fabrication (see the description above with respect to FIGS. 6 and 7) of the movable first carrier element 120 having the first Fabry-Perot filter stack 110 in combination with several spring designs, e.g., torsional and/or bending spring elements 135, can provide a reliable arrangement and it can be manufactured by the manufacturing process as described with respect to FIGS. 6 and 7 above.

The Fabry-Perot spacer 142, i.e., the distance $d_1$ between the first and second opposing Fabry-Perot filter stacks 110, 115, can be provided by means of a sacrificial layer 170 and by that, the spacer height $d_1$ is controlled in a single digit nanometer range, with almost no spacer height variations over the whole area of the cavity 142. This can also be achieved with the manufacturing method as described with respect to FIGS. 6 and 7 above.

A photodetector 210, e.g., in form of a photodiode or photodiode array, can be integrated in the movable first carrier element 120, e.g., by means of an implementation process of doping atoms (e.g., before or after the fabrication of the spring elements).

The movable first carrier element 120 (the movable part) is covered with a closed sealing in form of the capping structure 150. The surrounded cavity 142, 140 can even be evacuated or provided with a defined internal pressure.

Additional embodiments and aspects are described which may be used alone or in combination with the features and functionalities described herein.

According to an aspect, a tunable Fabry-Perot (FP) filter element comprises a first FP filter stack arranged at a movable first carrier element, and a second FP filter stack arranged in an opposing configuration to the first FP filter stack at a second carrier element, wherein, upon an actuation, the first carrier element with the first FP filter stack is vertically movable with respect to the second carrier element with the second FP filter stack, for adjusting the distance between the first and second opposing FP filter stack, and wherein the movable first carrier element is formed as an SON structure (SON=silicon-on-nothing) in an SON substrate, wherein the SON structure is movable suspended by means of a mechanical spring element to the SON substrate.

According to a further aspect, the filter element comprises an electrostatic actuator having a first and second electrode structure for effecting the electrostatic actuation by a potential difference between the first and second electrode structure.

According to a further aspect, the first electrode structure is arranged at the first carrier element, and the second electrode structure is arranged at the second carrier element.

According to a further aspect, the first electrode structure is arranged at the first carrier element, and the second electrode structure is arranged as a conductive region in the SON substrate.

According to a further aspect, one of the electrostatic electrodes is a conductive layer within one of the filter stacks.

According to a further aspect, the filter element further comprises a photodetector arranged at the movable first carrier element between the FP stack and the carrier element.

According to a further aspect, the photodetector at the first carrier element is integrated in a semiconductor material of the SON structure.

According to a further aspect, the photodetector at the first carrier element is integrated in a semiconductor layer epitaxially grown onto the SON structure.

According to a further aspect, the first FP stack and the second FP stack are arranged in a face-to-face configuration.

According to a further aspect, the spring element is formed as a torsional and/or bending spring element between the SON structure and the SON substrate.

According to a further aspect, a lid element is arranged on the SON substrate for hermetically covering the SON structure to maintain a defined internal pressure within the FP filter element.

According to a further aspect, the filter element further comprises pillar elements which extend through the movable carrier element and the FP stack and between the SON substrate and the lid element, wherein the pillar elements are mechanically coupled between the SON substrate and the lid element and mechanically decoupled from the movable carrier element and the FP stacks.

According to a further aspect, the filter element further comprises a comb drive structure laterally arranged between the SON structure and the SON substrate for capacitively sensing the vertical distance between the first and second opposing FP filter stack.

According to a further aspect, the filter element further comprises a control circuit configured to provide the electrostatic actuator with an actuation signal for controlling the distance between the first and second FP stack.

According to a further aspect, the actuator is formed as a thermal actuator having a thermal bending structure and/or as a piezoelectric actuator.

According to an aspect, a spectrometer device comprises an integrated, tunable Fabry-Perot (FP) filter element, and an optical detector which is arranged in an illumination direction downstream to the integrated, tunable Fabry-Perot (FP) filter element.

According to an aspect, a method for manufacturing a tunable Fabry-Perot (FP) filter element comprises forming a first FP filter stack on a SON substrate, forming a movable first carrier element as a SON structure in the SON substrate, wherein the SON structure is movable suspended by means of mechanical spring elements to the SON substrate, forming a sacrificial layer for covering the first FP filter stack on the SON substrate, forming a second FP filter stack on the sacrificial layer, forming a capping structure on the sacrificial layer, the capping structure having an opening for providing access to the sacrificial layer, forming an actuation structure coupled to the movable first carrier element for adjusting the distance between the first and second opposing FP filter stacks upon an actuation signal, and removing the sacrificial layer through the opening of the capping structure so that the first carrier element with the first FP filter stack is vertically movable with respect to the second carrier element with the second FP filter stack.

According to a further aspect, the step of forming the actuation structure comprises forming an electrostatic actuator, a piezoelectric actuator and/or a thermal actuator having a thermal bending structure, which is mechanically and/or electrically coupled to the movable first carrier element for adjusting the distance between the first and second opposing FP filter stacks.

According to a further aspect, the method further comprises forming an optical detector which is arranged in an illumination direction downstream to the integrated, tunable FP filter element.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. This application is intended to cover any adaptations or variations of the specific embodiments discussed herein. Therefore, it is intended that the embodiments be limited only by the claims and the equivalents thereof.

What is claimed is:

1. A tunable Fabry-Perot (FP) filter element, comprising:
   a first FP filter stack arranged at a movable first carrier element; and
   a second FP filter stack arranged in an opposing configuration to the first FP filter stack at a second carrier element,
   wherein, upon an actuation, the first carrier element with the first FP filter stack is vertically movable with respect to the second carrier element with the second FP filter stack, for adjusting the distance between the first and second opposing FP filter stack, and
   wherein the movable first carrier element is formed as a silicon-on-nothing (SON) structure in an SON substrate, wherein the SON structure is movable suspended by a mechanical spring element to the SON substrate.

2. The filter element according to claim 1, further comprising:
   an electrostatic actuator having a first and second electrode structure for effecting the electrostatic actuation by a potential difference between the first and second electrode structure.

3. The filter element according to claim 2, wherein the first electrode structure is arranged at the first carrier element, and wherein the second electrode structure is arranged at the second carrier element.

4. The filter element according to claim 2, wherein the first electrode structure is arranged at the first carrier element, and wherein the second electrode structure is arranged as a conductive region in the SON substrate.

5. The filter element according to claim 2, wherein one of the electrode structures is a conductive layer within one of the filter stacks.

6. The filter element according to claim 2, further comprising:
   a control circuit configured to provide the electrostatic actuator with an actuation signal for controlling the distance between the first and second FP filter stack.

7. The filter element according to claim 2, wherein the actuator is formed as a thermal actuator having a thermal bending structure and/or as an piezoelectric actuator.

8. The filter element according to claim 1, further comprising:
   a photodetector arranged at the movable first carrier element between the first FP filter stack and the first carrier element.

9. The filter element according to claim 8, wherein the photodetector at the first carrier element is integrated in a semiconductor material of the SON structure.

10. The filter element according to claim 8, wherein the photodetector at the first carrier element is integrated in a semiconductor layer epitaxially grown onto the SON structure.

11. The filter element according to claim 1, wherein the first FP filter stack and the second FP filter stack are arranged in a face-to-face configuration.

12. The filter element according to claim 1, wherein the spring element is formed as a torsional and/or bending spring element between the SON structure and the SON substrate.

13. The filter element according to claim 1, wherein a lid element is arranged on the SON substrate for hermetically covering the SON structure to maintain a defined internal pressure within the FP filter element.

14. The filter element according to claim 13, further comprising:
   pillar elements which extend through the movable first carrier element and the first FP filter stack and between the SON substrate and the lid element, wherein the pillar elements are mechanically coupled between the SON substrate and the lid element and mechanically decoupled from the movable first carrier element and the first FP filter stack.

15. The filter element according to claim 1, further comprising:
   a comb drive structure laterally arranged between the SON structure and the SON substrate for capacitively sensing the vertical distance between the first and second opposing FP filter stack.

16. A spectrometer device comprising:
an integrated, tunable Fabry-Perot filter element according to claim 1; and
an optical detector which is arranged in an illumination direction downstream to the integrated, tunable Fabry-Perot filter element.

17. A method for manufacturing a tunable Fabry-Perot (FP) filter element, the method comprising:
forming a first FP filter stack on a SON substrate;
forming a movable first carrier element as a SON structure in the SON substrate, wherein the SON structure is movably suspended by mechanical spring elements to the SON substrate;
forming a sacrificial layer for covering the first FP filter stack on the SON substrate;
forming a second FP filter stack on the sacrificial layer;
forming a capping structure on the sacrificial layer, the capping structure having an opening for providing access to the sacrificial layer;
forming an actuation structure coupled to the movable first carrier element for adjusting the distance between the first and second opposing FP filter stacks upon an actuation signal; and
removing the sacrificial layer through the opening of the capping structure so that the first carrier element with the first FP filter stack is vertically movable with respect to the second carrier element with the second FP filter stack.

18. The method according to claim 17, wherein forming the actuation structure comprises:
forming an electrostatic actuator, an piezoelectric actuator and/or a thermal actuator having a thermal bending structure, which is mechanically and/or electrically coupled to the movable first carrier element for adjusting the distance between the first and second opposing FP filter stacks.

19. The method according to claim 17, further comprising:
forming an optical detector which is arranged in an illumination direction downstream to the integrated, tunable FP filter element.

* * * * *